US009002144B2

(12) United States Patent
Fujikata et al.

(10) Patent No.: US 9,002,144 B2
(45) Date of Patent: Apr. 7, 2015

(54) ELECTRO-OPTICAL MODULATOR

(75) Inventors: Junichi Fujikata, Tokyo (JP); Jun Ushida, Tokyo (JP); Akio Toda, Tokyo (JP); Motofumi Saitoh, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 13/395,329

(22) PCT Filed: Jun. 8, 2010

(86) PCT No.: PCT/JP2010/059675
§ 371 (c)(1),
(2), (4) Date: Jun. 28, 2012

(87) PCT Pub. No.: WO2011/030593
PCT Pub. Date: Mar. 17, 2011

(65) Prior Publication Data
US 2012/0257850 A1    Oct. 11, 2012

(30) Foreign Application Priority Data

Sep. 10, 2009    (JP) ................. 2009-209766

(51) Int. Cl.
*G02F 1/035*    (2006.01)
*G02F 1/225*    (2006.01)
(Continued)

(52) U.S. Cl.
CPC .............. *G02F 1/2257* (2013.01); *G02F 1/025* (2013.01); *G02F 2001/0152* (2013.01); *G02F 2201/066* (2013.01); *G02F 2201/07* (2013.01); *G02F 2202/105* (2013.01)

(58) Field of Classification Search
CPC .............. G02F 1/025; G02F 1/2257; G02F 2001/0152; G02F 2201/066; G02F 2201/07; G02F 2202/10
USPC .................... 385/3, 14, 132; 430/321; 65/386
See application file for complete search history.

(56) References Cited

U.S. PATENT DOCUMENTS 5,565,693 A * 10/1996 Sasaki et al. .............. 257/94
5,770,466 A    6/1998 Sasaki et al.
(Continued)

FOREIGN PATENT DOCUMENTS

JP    6-260727 A    9/1994
JP    2002-540469 A    11/2002
(Continued)

OTHER PUBLICATIONS

International Search Report for PCT/JP2010/059675 dated Aug. 31, 2010.
(Continued)

*Primary Examiner* — Peter Radkowski
(74) *Attorney, Agent, or Firm* — Sughrue Mion, PLLC

(57) ABSTRACT

A downsized, low-power electro-optical modulator that achieves reducing both of the additional resistance in the modulation portion and the optical loss each caused by electrodes at the same time is provided. The electro-optical modulator includes a rib waveguide formed by stacking a second semiconductor layer 9 having a different conductivity type from a first semiconductor layer 8 on the first semiconductor layer 8 via a dielectric film 11, and the semiconductor layers 8 and 9 are connectable to an external terminal via highly-doped portions 4 and 10, respectively. In a region in the vicinity of contact surfaces of the semiconductor layers 8 and 9 with the dielectric film 11, a free carrier is accumulated, removed, or inverted by an electrical signal from the external terminal, and whereby a concentration of the free carrier in an electric field region of an optical signal is modulated, so that a phase of the optical signal can be modulated. At least one of the semiconductor layers 8 and 9 is wider than the stacked portion. At least one of the highly-doped portions 4 and 10 is formed outside the stacked portion.

19 Claims, 19 Drawing Sheets

(51) Int. Cl.
　　　*G02F 1/025* 　　(2006.01)
　　　*G02F 1/015* 　　(2006.01)

(56) References Cited

U.S. PATENT DOCUMENTS

| | | | |
|---|---|---|---|
| 6,298,177 | B1 | 10/2001 | House |
| 6,912,079 | B2 * | 6/2005 | Liu ................................ 359/279 |
| 7,068,870 | B2 * | 6/2006 | Steinberg et al. ............... 385/14 |
| 7,880,201 | B2 * | 2/2011 | Vlasov et al. .................. 257/212 |
| 8,014,636 | B2 * | 9/2011 | Shubin et al. ..................... 385/3 |
| 2001/0024537 | A1 * | 9/2001 | Tabuchi ............................ 385/3 |
| 2003/0039461 | A1 * | 2/2003 | How Kee Chun et al. .... 385/140 |
| 2003/0118310 | A1 * | 6/2003 | Steinberg et al. ............. 385/132 |
| 2004/0160658 | A1 * | 8/2004 | Liu ................................ 359/279 |
| 2004/0208454 | A1 * | 10/2004 | Montgomery et al. ......... 385/50 |
| 2005/0189591 | A1 * | 9/2005 | Gothoskar et al. ............ 257/347 |
| 2007/0154157 | A1 * | 7/2007 | Horine et al. .................. 385/132 |
| 2008/0112032 | A1 * | 5/2008 | Vlasov et al. .................. 359/248 |
| 2009/0297094 | A1 * | 12/2009 | Hochberg et al. ............... 385/14 |
| 2010/0150495 | A1 * | 6/2010 | Kawanishi et al. ............... 385/3 |
| 2010/0215309 | A1 * | 8/2010 | Shubin et al. ..................... 385/3 |

FOREIGN PATENT DOCUMENTS

| | | |
|---|---|---|
| JP | 2006-515082 A | 5/2006 |
| JP | 2007-155876 A | 6/2007 |
| JP | 2007-525711 A | 9/2007 |
| JP | 2007-256552 A | 10/2007 |

OTHER PUBLICATIONS

William M.J. Green et al., "Ultra-compact, low RF power, 10 Gb/s silicon Mach-Zehnder modulator", Optics Express, Dec. 2007, pp. 1-8, vol. 15, No. 25.

* cited by examiner

ELECTRO-OPTICAL MODULATOR

CROSS REFERENCE TO RELATED APPLICATIONS

This application is a National Stage of International Application No. PCT/JP2010/059675 filed Jun. 8, 2010, claiming priority based on Japanese Patent Application No. 2009-209766 filed Sep. 10, 2009, the contents of all of which are incorporated herein by reference in their entirety.

TECHNICAL FIELD

The present invention relates to an electro-optical modulator.

BACKGROUND ART

A silicon-based optical communication device is a highly-promising technology that enables an optical functional element and an electronic circuit to be integrated on the upper side of a silicon platform, utilizing a CMOS technology. The silicon-based optical communication device functions at the optical fiber communication wavelengths of 1330 and 1500 nm for various systems such as an optical fiber for residential use and Local Area Network (LAN), for example.

Recently, passive devices such as silicon-based waveguides, optical couplers, and wavelength filters are really widely researched. Moreover, as an important technology of a means for managing an optical signal for such a communication system, active elements such as silicon-based optical modulators and silicon-based optical switches are offered and are getting a lot of attention. An optical switch or optical modulator that changes a refractive index by utilizing the thermo-optical effect of silicon operates at low speed and can only be used in devices with a modulation frequency of less than 1 Mb/sec. Therefore, in order to obtain the high modulation frequency required in more optical communication systems, electro-optical modulators utilizing the electro-optical effect are necessary.

Most currently-proposed electro-optical modulators are devices of changing an optical phase and optical intensity by changing a real part and imaginary part of a refractive index through a change in free carrier density in a silicon layer by utilizing the carrier plasma effect. In modulators utilizing the free carrier absorption, an output is directly modulated by a change in optical absorption propagating in Si.

An example of a structure of a general electro-optical modulator (e.g., see FIG. 1 of Patent Document 1 and FIG. 2 of Patent Document 2) is shown in a cross-sectional view of FIG. 18. This electro-optical modulator is a silicon-based electro-optical phase modulator utilizing the shape of a rib waveguide formed on the upper side of an SOI substrate. As shown in FIG. 18, in this electro-optical phase modulator, slab regions extending laterally are formed, as a $p^+$-doped semiconductor silicon 4 and an $n^+$-doped semiconductor silicon 5, on both end sides of the shape formed of an intrinsic semiconductor silicon region 1. The structure of the rib waveguide is formed utilizing an Si layer (buried oxide layer) 2 on the upper side a Silicon On Insulator (SOI) substrate 3. The structure shown in FIG. 18 is a structure of a PIN diode type modulator, and with this structure, the free carrier density in an intrinsic semiconductor region is changed by applying a forward bias and a reverse bias, and a refractive index is changed utilizing the carrier plasma effect. In this example, the intrinsic semiconductor silicon layer 1 is formed so as to include a p-type region 4 doped so as to have a high doping concentration in a region of being in contact with a first electrode contact layer 6. In FIG. 18, the intrinsic semiconductor silicon layer 1 further includes the n-type region 5 doped so as to have a high doping concentration and a second electrode contact layer 6 connected thereto. In the structure of the above-described PIN diode, the regions 4 and 5 can be doped so as to each have the carrier density of about $10^{20}/cm^3$. Moreover, in the structure of the above-described PIN diode, the p-type region 4 and the n-type region 5 are arranged on the both end sides of the rib 1 at a distance, and the rib 1 is the intrinsic semiconductor. The upper surface of the intrinsic semiconductor silicon 1 is covered with an oxide cladding 7.

Patent Document 1 proposes a silicon-based electro-optical modulator including a main body region having a second conductivity type and a gate region having a first conductivity type that is different from the second conductivity type of the main body region, being stacked on the main body region so as to partially overlap therewith, wherein a relatively thin dielectric layer is formed on the interface of the stack. The silicon-based electro-optical modulator with the SIS (silicon-insulator-silicon) type structure of Patent Document 1 is illustrated in the cross-sectional view of FIG. 19. As shown in FIG. 19, this silicon-based electro-optical modulator is formed on the upper side of an SOI platform composed of a supporting substrate 3 and a buried oxide layer 2 formed thereon. The main body region 8 is formed as a relatively thin p-doped silicon surface layer configuring an SOI substrate. The gate region 9 is formed as a relatively thin n-doped polycrystalline silicon layer stacked on the upper side of the SOI substrate (main body region) 8 via an insulating layer. The gate region and the main body region are doped, and the doped regions are defined so that the change in the carrier density is controlled by an external signal voltage. One end portion of the main body region 8 is formed as a $p^+$-doped semiconductor silicon 4, and an electrode contact layer 6 is formed thereon. One end portion of the gate region 9 is formed as an $n^+$-doped polycrystalline silicon 10, and another electrode contact layer 6 is formed thereon. The upper surfaces of the main body region 8 and the gate region 9, and a spaces between the main body region 8 and the SOI platform and between the gate region 9 and the same are filled with an oxide cladding 7. In this silicon-based electro-optical modulator, an optical phase modulation is carried out by accumulation, removal, or inversion of free carriers in the both end sides of the dielectric layer. Ideally, an electric field of an optical signal agrees with a region in which the carrier density is dynamically subjected to external control.

PRIOR ART DOCUMENTS

Patent Document

Patent Document 1: JP 2006-515082 A
Patent Document 2: JP 2002-540469 A

Non-Patent Document

Non-Patent Document 1: William M. J. Green, Michael J. Rooks, Lidija Sekaric, and Yurii A. Vlasof, Opt. Express 15, 17106-17113 (2007), "Ultra-compact, low RF power, 10 Gb/s silicon Mach-Zehnder modulator"

SUMMARY OF INVENTION

Problem to be Solved by the Invention

The free carrier density in an electro-optical modulator can be changed by the injection, accumulation, removal, or inversion of free carriers. Most electro-optical modulators that have been considered so far have poor optical modulation efficiency and require a mm-order length for an optical phase modulation and the implantation current density higher than 1 kA/cm$^3$. In order to obtain a downsized, highly-integrated, low-power consumption electro-optical modulator, the electro-optical modulator is required to have an element structure with which high optical modulation efficiency can be obtained. Obtaining higher optical modulation efficiency enables a reduction in the length of the optical phase modulation. In addition, a large-size element is prone to be affected by a temperature distribution on a silicon platform, and problems of canceling the original electro-optical effect by the change in refractive index of a silicon layer resulting from the thermo-optical effect are expected.

For example, the electro-optical modulator shown in FIG. 18 is connected to a power supply so that, during an optical modulation operation, free carriers are injected into a waveguide by applying a forward bias to a PIN diode using first and second electrodes. At that time, the increase in concentration of the free carriers causes a change in refractive index of a silicon layer 1, which results in a phase modulation of light transmitted through the waveguide. However, the speed of this optical modulation operation is limited by the free carrier life time in the rib 1 and the carrier diffusion when a forward bias is removed. A phase modulator with a PIN diode, such as shown in FIG. 18, typically has the operation speed within the range from 10 to 50 Mb/sec when a forward bias is operated. In contrast, although the switching speed can be increased by introducing an impurity into the silicon layer in order to shorten the carrier life time, the introduced impurity entails the decrease in optical modulation efficiency. Moreover, the great factor affecting the operation speed is the RC time constant. That is, the electrostatic capacity (C) while applying a forward bias becomes really high due to the reduction in thickness of the carrier depletion layer in the PN junction portion. Theoretically, the PN junction portion can be operated at high speed by applying a reverse bias, and this approach, however, requires a high drive voltage or a large-size element.

The electro-optical modulator of Patent Document 1 described in FIG. 19 has a problem in that the thickness of a region in which the carrier density actually changes dynamically is really thin, i.e., in the order of several tens of nm. Therefore, a mm-order length of the optical modulation becomes necessary, and the size of the electro-optical modulator increases. Thus, it becomes difficult to operate at high speed.

That is, in the PIN structure shown in FIG. 18 and the SIS structure shown in FIG. 19, there is a drawback that the overlap between the optical field and the region in which the carrier density is modulated is small, which results in the increase in the length of the electro-optical modulation.

One reason for the above-mentioned problems is difficulty in reducing both of an additional resistance and an optical loss each caused by electrodes. That is, when the electro-optical modulator is operated at high speed, it is necessary to reduce the additional resistance by bringing the electrodes close to the optical modulation region, and at that time, an optical loss is generated by overlapping between the electrode layer and an optical field. Therefore, it is difficult to reduce both of the additional resistance and the optical loss each caused by the electrodes at the same time.

Hence, the present invention is intended to provide a downsized, low-power electro-optical modulator that achieves reducing both of the additional resistance in the modulation portion and the optical loss each caused by the electrodes at the same time.

Means for Solving Problem

In order to achieve the aforementioned object, the present invention provides an electro-optical modulator including: a first semiconductor layer; a second semiconductor layer; and a dielectric film, wherein the first semiconductor layer and the second semiconductor layer are being doped so that a conductivity type of the first semiconductor layer is different from that of the second semiconductor layer, a portion of the first semiconductor layer is a first highly-doped portion with a high doping concentration compared with the other portion of the first semiconductor layer, a portion of the second semiconductor layer is a second highly-doped portion with a high doping concentration compared with the other portion of the second semiconductor layer, the first highly-doped portion and the second highly-doped portion each is connectable to an external terminal directly or via other member, a rib waveguide is formed by stacking the second semiconductor layer on an upper side of the first semiconductor layer via the dielectric film, in a region in the vicinity of contact surfaces of the first semiconductor layer and the second semiconductor layer with the dielectric film, a free carrier is accumulated, removed, or inverted by an electrical signal from the external terminal, and whereby a concentration of the free carrier in an electric field region of an optical signal is modulated, so that a phase of the optical signal can be modulated, at least one of the first semiconductor layer and the second semiconductor layer is wider than a stacked portion including the first semiconductor layer, the dielectric film, and the second semiconductor layer, and at least one of the first highly-doped portion and the second highly-doped portion is formed outside the stacked portion.

The present invention further provides a Mach-Zehnder interferometer-type optical intensity modulator including: a first arm; a second arm; an optical branch path; and an optical coupling path, wherein the first arm and the second arm each includes the electro-optical modulator of the present invention and each has an input function and an output function, the optical branch path and the optical coupling path each includes a rib waveguide, the optical branch path binds to input sides of the first arm and the second arm, branches an optical signal entered into the optical branch path, and can input the respective branched optical signals into the first arm and the second arm, the first arm and the second arm can modulate phases of the respective input, branched optical signals and output the respective modulated optical signals, the optical coupling path binds to output sides of the first arm and the second arm, causes the respective optical signals subjected to the phase modulation in the first arm and the second arm and output to be subjected to phase interference by binding the optical signals, thereby being capable of converting the optical signals into an optical intensity modulation signal.

The present invention further provides a Mach-Zehnder interferometer-type optical intensity modulator integrated structure, including a plurality of the Mach-Zehnder interferometer-type optical intensity modulators of the present invention.

Effects of the Invention

According to the present invention, a downsized, low-power electro-optical modulator that achieves reducing both of the additional resistance in the modulation portion and the optical loss each caused by the electrodes at the same time can be provided.

DESCRIPTION OF EMBODIMENTS

Figure 1:
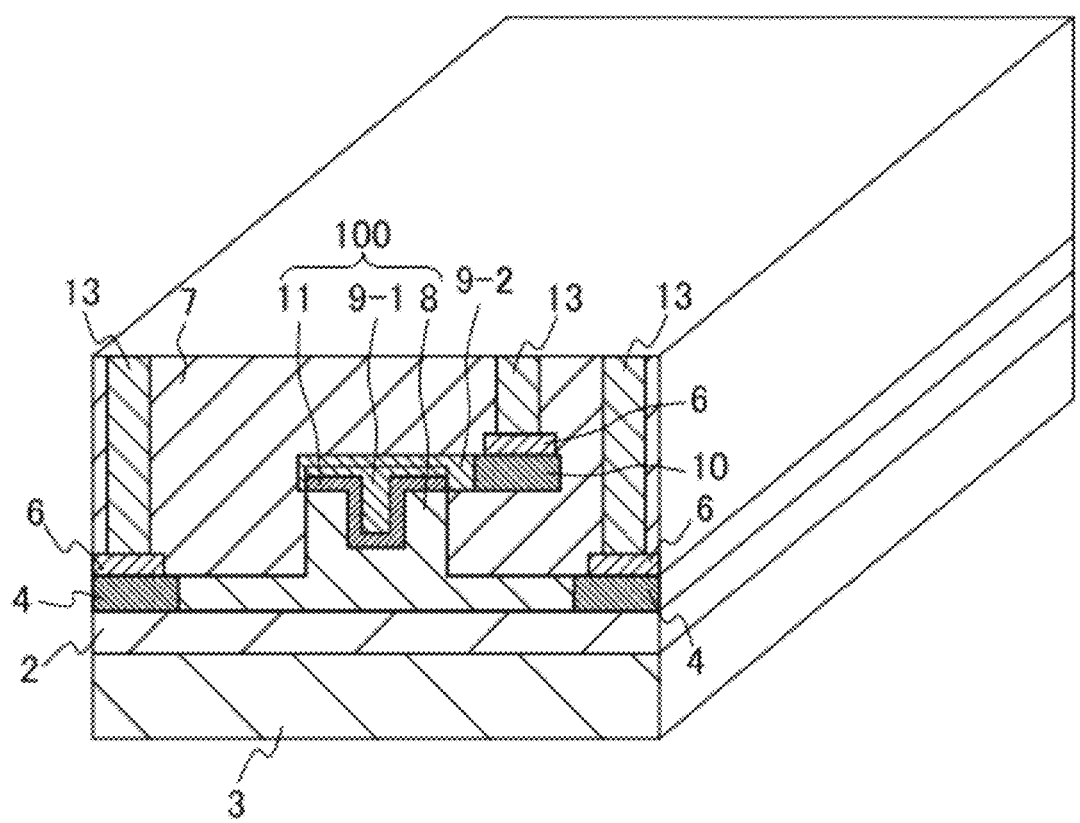
FIG. 1 is a cross-sectional perspective view illustrating a structure of an electro-optical modulator in an embodiment of the present invention.

When the electro-optical modulator of the present invention has the above-mentioned structure, optical losses in the highly-doped portions can be reduced. Thus, a downsized, low-power electro-optical modulator that achieves reducing both of the additional resistance in the modulation portion and the optical loss each caused by the electrodes at the same time can be provided.

It is preferred that the electro-optical modulator of the present invention further includes: a first electrode contact layer; and a second electrode contact layer, the first electrode contact layer is joined to the first highly doped portion, the second electrode contact layer is joined to the second highly-doped portion, the first highly-doped portion is connectable to an external terminal via other member at least including the first electrode contact layer, and the second highly-doped portion is connectable to an external terminal via other member at least including the second electrode contact layer. The first electrode contact layer and the second electrode contact layer make it possible to reduce the connection resistance between the external terminal and the electro-optical modulator of the present invention.

The first semiconductor layer and the second semiconductor layer are preferably formed of silicon. That is, the electro-optical modulator of the present invention is preferably a silicon-based electro-optical modulator. As the silicon, pure silicon is more preferable because it does not exhibit the linear electro-optical effect (Pockels effect) and the change in the refractive index thereof by the Franz-Keldysh effect or the Kerr effect is really small. The electro-optical modulator of the present invention is, however, by no means limited thereto and may be formed of a semiconductor other than the silicon semiconductor.

It is preferred that a portion of the first semiconductor layer on which the dielectric film and the second semiconductor layer are stacked has an concavo-convex shape, and the dielectric film and the second semiconductor layer are stacked on the portion so as to be fitted in the concavo-convex shape. Thus, the overlap between the region in which the carrier density is modulated and the optical field is improved, and the modulation efficiency is further enhanced. In this case, from the viewpoint of making the above-mentioned effect to be further superior, it is more preferred that the concavo-convex shape of the first semiconductor layer is a shape having a curvature. In the present invention, a "shape having a curvature" refers to a shape in which a surface has at least one of a curve and a curved surface. In the present invention, a "rib waveguide" or a "rib-type waveguide" is a waveguide formed of a semiconductor layer and has a convex portion. For example, in the electro-optical modulator of the present invention, as mentioned above, a rib waveguide is formed by stacking the second semiconductor layer on the upper side of the first semiconductor layer via the dielectric film. That is, the stacked portion including the first semiconductor, the dielectric film, and the second semiconductor forms a convex portion on the upper side of the first semiconductor, so that the rib waveguide is formed.

In the electro-optical modulator of the present invention, it is more preferred that, with respect to a thickness W (nm) of a region of the second semiconductor layer in which a free carrier is accumulated, removed, or inverted, at least one of a maximum width of a convex portion in the concavo-convex shape of the first semiconductor layer and a maximum width of a buried portion of the second semiconductor layer buried in a concave portion of the first semiconductor layer is 2 W (nm) or less. The "free carrier" means an electron or a hole. Hereinafter, W is also referred to as the "maximum thickness of a depletion layer".

In the case where the stacked portion including the first semiconductor layer, the dielectric film, and the second semiconductor layer in the electro-optical modulator of the present invention has a concavo-convex shape, it is more preferred that, with respect to an effective refractive index $n_{eff}$ that is felt by an electric field of an optical signal in the electro-optical modulator and a wavelength λ (nm) of the optical signal, a height of the convex portion in the concavo-convex shape of the first semiconductor or a depth (length) of a buried portion of the second semiconductor layer buried in the concave portion of the first semiconductor layer is $\lambda/n_{eff}$ (nm) or less. By controlling the shape of the buried portion of the second semiconductor layer buried in the concave portion so that the overlap between the optical field and the region in which the carrier density is modulated becomes large as described above, an optical phase can be modulated further efficiently. In the present invention, the effective refractive index felt by the electric field of the optical signal is a refractive index influencing or affecting the electric field of the optical signal. The "feeling" the effective refractive index by the electric field of the optical signal refers to influencing or affecting the electric field of the optical signal by the effective refractive index.

In the electro-optical modulator of the present invention, it is preferred that an effective refractive index of a portion of the second semiconductor layer formed above the rib waveguide portion is 10% or more less than an effective refractive index of the rib waveguide. Therefore, it becomes possible to reduce the amount of a component of light guided through the rib waveguide (optical modulation portion), being leaked in the second semiconductor layer formed in the upper portion of the rib waveguide to the extent that it is ignorable. Thus, it becomes possible to further reduce the optical loss caused by the electrodes in the electro-optical modulator and further enhancing the modulation efficiency.

The second semiconductor layer is not particularly limited and is preferably a polycrystalline semiconductor layer.

In the electro-optical modulator of the present invention, it is preferred that a region in which an electric field of an optical signal exerts peak intensity is present in a region in which a free carrier is accumulated, removed, or inverted.

It is preferred that the first semiconductor layer is formed of at least one semiconductor layer selected from the group consisting of polycrystalline silicon, amorphous silicon, strained silicon, single-crystalline silicon, and $Si_XGe_{1-X}$ (0≤X<1). The same applies to the second semiconductor layer. Each of the first semiconductor layer and the second semiconductor layer may be formed of a single layer or may be a stack of a plurality of layers.

It is preferred that the electro-optical modulator of the present invention satisfies at least one of the following conditions (A) and (B). When the electro-optical modulator of the present invention satisfies at least one of the following conditions (A) and (B), it is more easy to reduce both of the additional resistance in the modulation portion and the optical loss each caused by electrodes at the same time. From the viewpoint of this, it is more preferred that the electro-optical modulator of the present invention satisfies both of the following conditions (A) and (B): (A) a condition where the first semiconductor layer extends from a stacked portion including the first semiconductor layer, the dielectric film, and the second semiconductor layer in both directions along a direction perpendicular to a stacking direction and a rib waveguide direction, and each of the extending portions is provided with the first highly-doped portion; and (B) a condition where the second semiconductor layer extends from a stacked portion including the first semiconductor layer, the dielectric film, and the second semiconductor layer in both directions along a direction perpendicular to a stacking direction and a rib waveguide direction, and each of the extending portions is provided with the second highly-doped portion. The "rib waveguide direction" refers to a direction in which a light wave is guided in the rib waveguide. Hereinafter, both directions along a direction perpendicular to a stacking direction and a rib waveguide direction is also merely referred to as "left" and "right" or "left and right".

In the electro-optical modulator of the present invention, it is preferred that an electrical modulation signal can be converted into an optical modulation signal by inputting the electrical modulation signal into at least one of the first highly-doped portion and the second highly-doped portion.

In the Mach-Zehnder interferometer-type optical intensity modulator of the present invention, it is preferred that the rib-type waveguide in each of the optical branch path and the optical coupling path is an Si (silicon) waveguide. That is, the electro-optical modulator of the present invention is preferably a silicon-based electro-optical modulator. As the silicon, pure silicon is more preferable because it does not exhibit the linear electro-optical effect (Pockels effect) and the change in the refractive index thereof by the Franz-Keldysh effect or the Kerr effect is really small. The electro-optical modulator of the present invention is, however, by no means limited thereto and may be formed of a semiconductor other than the silicon semiconductor.

It is preferred that an effective refractive index felt by an electric field of an optical signal in the rib waveguide of each of the optical branch path and the optical coupling path is in a range from 95% to 105% with respect to each of effective refractive indexes of the respective parts of the first arm and the second arm to be subjected to the phase modulation.

In the Mach-Zehnder interferometer-type optical intensity modulator of the present invention, it is preferred that a length of the first arm is different from that of the second arm.

It is preferred that the optical branch path can input the respective signals with different intensities from each other to the first arm and the second arm.

The Mach-Zehnder interferometer-type optical intensity modulators of the present invention may be used as a Mach-Zehnder interferometer-type optical intensity modulator integrated structure by assembling a plurality of them. That is, the Mach-Zehnder interferometer-type optical intensity modulators of the present invention may be used by linking a plurality of them, for example. In the Mach-Zehnder interferometer-type optical intensity modulator integrated structure of the present invention, the plurality of the Mach-Zehnder interferometer-type optical intensity modulators of the present invention are arranged in parallel or in series. For example, in the case where three or more Mach-Zehnder interferometer-type optical intensity modulators are arranged, an arrangement in parallel and an arrangement in series may be used in combination.

According to the present invention, the overlap between the region in which the free carrier density is changed and the optical field can be improved. Therefore, according to the present invention, as mentioned above, for example, a downsized, low-power electro-optical modulator that achieves reducing both of the additional resistance in the optical modulation portion and the optical loss each caused by the electrodes at the same time can be obtained. According to the present invention, an optical modulator structure based on the free carrier plasma dispersion effect, which can achieve low cost, low current density, low-power consumption, high modulation degree, low-voltage drive, and high-speed modulation in a sub-micron region of the silicon-based electro-optical modulator that can be integrated on the upper side of an Si substrate can also be obtained, for example.

The electro-optical modulator of the present invention can be used as a silicon-based electro-optical modulator of converting a high-speed electrical signal to an optical signal at high speed, which is required in the information handling field and the communication field, for example. The structure of the electro-optical modulator may be a capacitor structure composed of silicon-insulator-silicon, being formed on the upper side of a Silicon On Insulator (SOI) substrate in order to operate at sufficiently high speed, for example. Furthermore, as the structure utilizing the change in refractive index, for example, as mentioned above, a plurality of the electro-optical modulation elements of the present invention can be arranged so as to have the Mach-Zehnder interferometer-type. With this structure, it is possible to obtain an optical intensity modulation signal by interfering the optical phases of two arms with each other, for example.

Prior to the description of specific embodiments, a modulation mechanism in the electro-optical modulator of the present invention is described with reference to a silicon-based electro-optical modulator as an example. However, the following description and mathematical expressions are mere examples of theoretical considerations and do not at all limit the present invention. Furthermore, there is a case where actual operations and the like of the electro-optical modulator do not mach to the theoretical operations and the like. When the present invention is defined by a numerical limitation, the numerical value may be exactly the numerical value or about the numerical value.

Some of the embodiments shown in the figures are related to the modulation structure. The silicon-based electro-optical modulator of the present invention however utilizes the electro-optical effect (free carrier plasma effect) described below, for example. The pure electro-optical effect is not exhibited or slightly exhibited in silicon. Therefore, only the free carrier plasma dispersion effect and thermo-optical effect can be utilized in optical modulation operation. The free carrier plasma dispersion effect is only effective for the high-speed operation (1 Gb/sec or more) intended in the present invention, which can be described by the following first-order approximation values of the mathematical expressions 1 and 2.

$$\Delta n = -\frac{e^2 \lambda^2}{8\pi^2 c^2 \varepsilon_0 n} \left( \frac{\Delta N_e}{m_e} + \frac{\Delta N_h}{m_h} \right)$$ [Mathematical Expression 1]

$$\Delta k = -\frac{e^3 \lambda^2}{8\pi^2 c^3 \varepsilon_0 n} \left( \frac{\Delta N_e}{m_e^2 \mu_e} + \frac{\Delta N_h}{m_h^2 \mu_h} \right)$$ [Mathematical Expression 2]

In the mathematical expressions 1 and 2, $\Delta n$ represents the change in the real part of the refractive index of the silicon layer, $\Delta k$ represents the change in the imaginary part of the refractive index of the silicon layer, e represents the electric charge, $\lambda$ represents the optical wavelength, $\varepsilon_0$ represents the dielectric constant in vacuum, n represents the refractive index of intrinsic semiconductor silicon, $\mu_e$ represents the effective mass of the electron carrier, $\mu_h$ represents the effective mass of the hole carrier, $\mu_e$ represents the mobility of the electron carrier, $\mu_h$ represents the mobility of the hole carrier, $\Delta N_e$ represents the change in concentration of the electron carrier, and $\Delta N_h$ represents the chance in concentration of the hole carrier. It is known from the experimental evaluations of the electro-optical effect in silicon that the change in the refractive index with respect to the carrier densities at the wavelengths of 1310 and 1550 nm that are used in the optical communication system agrees well with the result obtained by the Drude's equations (the above mathematical expressions 1 and 2). In addition, in an electro-optical modulator utilizing this free carrier plasma dispersion effect, the amount of change in phase is defined by the following mathematical expression 3.

$$\Delta \theta = \frac{2\pi}{\lambda} \Delta n_{\mathit{eff}} L$$ [Mathematical expression 3]

In the above mathematical expression 3, L represents the length of the active layer along the light propagation direction of the electro-optical modulator.

In the present invention, the effect by the amount of change in phase is great compared with the effect by optical absorption, and the electro-optical modulator of the present invention can basically exhibit characteristics of a phase modulator.

Specific embodiments of the present invention are described below. The embodiments are, however, merely illustrative, and the present invention is by no means limited thereto. It is to be noted that there is a case where structures of some components are simplified, and dimensional ratios of components differ from the actual ratios, as a matter of convenience of description.

First Embodiment

One embodiment of the electro-optical modulator of the present invention is shown in the cross-sectional perspective view of FIG. 1. This electro-optical modulator is an electro-optical phase modulator using the free carrier plasma effect, in which a SIS junction (silicon semiconductor-dielectric layer-silicon semiconductor junction) structure is formed on the upper side of an SOI substrate. In FIG. 1, in order to simplify the figure, the detailed illustration of the structure except the cross-sectional portion is omitted. The same applies to all cross-sectional perspective views shown below.

As shown in FIG. 1, this electro-optical phase modulator includes: a p-doped semiconductor silicon 8 (first semiconductor layer); an n-doped polycrystalline silicon 9 (second semiconductor layer); a dielectric film 11; and a plurality of electrode contact layers 6 (first electrode contact layers and a second electrode contact layer). They are arranged on the upper side of a buried oxide layer 2 of a Silicon On Insulator (SOI) substrate obtained by forming the buried oxide layer 2 on the upper surface of a supporting substrate 3. The n-doped polycrystalline silicon 9 (second semiconductor layer) is shown by dividing it into a portion 9-1 of forming a rib waveguide described below (hereinafter also referred to as a "rib waveguide portion 9-1") and a portion 9-2 except the rib waveguide (hereinafter also referred to as a "portion 9-2") as a matter of convenience. The portion 9-2 is stacked on the upper surface of the rib waveguide portion 9-1. However, in actual fact, the rib waveguide portion 9-1 and the portion 9-2 are integrally formed, and the boundary between them is not clear. The p-doped semiconductor silicon 8 (first semiconductor layer) is formed on the entire upper surface of the buried oxide layer 2. The rib waveguide portion 9-1 of the n-doped polycrystalline silicon 9 (second semiconductor layer) is stacked on a portion of the upper side of the p-doped semiconductor silicon 8 (first semiconductor layer) via the dielectric film 11. A rib waveguide 100 is formed of the first semiconductor layer 8, the dielectric film 11, and the rib waveguide portion 9-1 of the second semiconductor layer. The first semiconductor layer 8 extends from left and right ends of the stacked portion. In the left end portion of the extending portion and the right end portion of the other extending portion, p$^+$-doped semiconductor silicon 4 (the respective first highly-doped portions) with a high doping concentration compared with the other portion of the p-doped semiconductor silicon 8 (first semiconductor layer) are formed. The electrode contact layers 6 (first electrode contact layers) are joined to the respective upper surfaces of the p$^+$-doped semiconductor silicon 4 in the left end portion and the right end portion. The portion 9-2 of the n-doped polycrystalline silicon 9 (second semiconductor layer) is stacked on the upper surface of the rib waveguide portion 9-1, is wider than the stacked portion, and extends from the right side of the stacked portion as viewed in the figure. An n$^+$-doped semiconductor silicon 10 (second highly-doped portion) with a high doping concentration compared with the other portion of the n-doped polycrystalline silicon 9 (second semiconductor layer) is formed in the right end portion of the extending portion. An electrode contact layer 6 (second electrode contact layer) is joined to the upper surface of the n$^+$-doped semiconductor silicon 10 (second highly-doped portion). The upper surfaces of the electrode contact layers 6 (first electrode contact layers and second electrode contact layer) are provided with the respective via wires 13. The via wires 13 reach to the upper surface of the electro-optical modulator, so that this electro-optical modulator can connect to the other device, a power supply, a circuit, and the like at portions of the via wires exposed on the upper surface via an external terminal. Therefore, free carriers are accumulated, removed, or inverted by an electrical signal from the first highly-doped portions and the second highly-doped portion in a region in the vicinity of contact surfaces of the first semiconductor layer and the second semiconductor layer with the dielectric film 11 of the stacked portion including the p-doped semiconductor silicon 8 (first semiconductor layer), the dielectric film 11, and the n-doped polycrystalline silicon 9 (second semiconductor layer). Thus, the concentration of the free carriers in an electric field region of an optical signal can be modulated. Then, by the modulation of the concentration of the free carriers, the phase velocity in the electric field of the optical signal is changed. Thus, the phase of the optical signal can be modulated. It is to be noted that the electro-optical modulator of FIG. 1 is a silicon-based electro-optical modulator, so that it can be said that the stacked portion including the p-doped semiconductor silicon 8 (first semiconductor layer), the dielectric film 11, and the n-doped polycrystalline silicon 9 (second semiconductor layer) is an SIS junction portion. Spaces between components, formed on the upper side of the buried oxide layer 2 are filled with an oxide cladding 7. The p-doped semiconductor silicon 8 (first semiconductor layer) and the n-doped polycrystalline silicon 9 (second semiconductor layer) are formed of at least one layer selected from the group consisting of polycrystalline silicon, amorphous silicon, strained silicon, single-crystalline silicon, and $Si_XGe_{1-X}$ (0≤X<1), for example. A material of each electrode contact layer 6 is not particularly limited and can be, for example, an alloy of silicon and a metal, and specific examples thereof include an alloy of silicon and nickel and an alloy of silicon and titanium.

In the present invention, a state of being "on the upper side" is not limited to a state of being directly in contact with the upper surface unless otherwise indicated and includes a state of being indirectly in contact with the upper surface, i.e., being above the upper surface, via other component. Similarly, a state of being "on the lower side" may be a state of being directly in contact with the lower surface or a state of being indirectly in contact with the lower surface, i.e., being below the lower surface, via other component, unless otherwise indicated. A state of being "on the upper surface" indicates a state of being directly in contact with the upper surface. Similarly, a state of being "on the lower surface" indicates a state of being directly in contact with the lower surface. A state of being "at the one side" may be a state of being directly in contact with the one side or a state of being indirectly in contact with the one side via other component, unless otherwise indicated. The same applies to a state of being "at the both sides". A state of being "on the one side" indicates a state of being directly in contact with the one side. The same applies to a state of being "on the both sides".

According to the electro-optical modulator of the present example with such a structure, it becomes possible to reduce the amount of a series resistance component and an RC time constant, as well as reducing optical losses in highly doped layers (highly-doped portions).

Moreover, as shown in FIG. 1, the electro-optical modulator of the present invention has a concavo-convex shape in the SIS junction portion of the p-doped semiconductor silicon 8 (first semiconductor layer). The upper surface and the entire concave portion of the SIS junction portion in the upper surface of the p-doped semiconductor silicon 8 (first semiconductor layer) as an SOI layer are being covered with the dielectric film 11. The dielectric film 11 and the n-doped polycrystalline silicon 9 (second semiconductor layer) are formed so as to be buried in the concave portion of the concavo-convex shape, thereby forming an SIS junction. That is, in the SIS junction portion, the dielectric film 11 and the n-doped polycrystalline silicon 9 (second semiconductor layer) are stacked so as to be fitted in the concavo-convex shape of the p-doped semiconductor silicon 8 (first semiconductor layer). With this configuration, an overlap between a region in which the carrier density is modulated and the optical field is improved, and the modulation efficiency is further enhanced.

The concave portion (trench) of the p-doped semiconductor silicon 8 (first semiconductor layer) can be formed by processing the first semiconductor layer by etching or the like, for example. It is preferred that the effective refractive index of the n-doped polycrystalline silicon 9 (second semiconductor layer) formed in the upper portion of the rib waveguide is, as mentioned above, 10% or more less than the effective refractive index of the rib waveguide.

Further, it is also preferred that, with respect to the thickness W (nm) of a region of the second semiconductor layer in which free carriers are accumulated, removed, or inverted, the maximum width of a buried portion of the second semiconductor layer buried in a concave portion of the first semiconductor layer is 2 W (nm) or less. Although the effect of improving the modulation efficiency is obtained even when the maximum width is 2 W or more, the effect is exerted more effectively when it is 2 W or less. The maximum thickness W of a depletion layer is obtained by the mathematical expression 4 in the thermal equilibrium state.

$$W = 2\sqrt{\frac{\varepsilon_s kT \ln\left(\frac{N_c}{n_i}\right)}{e^2 N_c}}$$

In the mathematical expression 4, $\varepsilon_s$ represents the dielectric constant of semiconductor layer, k represents the Boltzmann constant, $N_c$ represents the carrier density, $n_i$ represents the intrinsic carrier concentration, and e represents the electric charge amount. For example, when $N_c$ is $10^{17}/cm^3$, the maximum thickness of a depletion layer is about 0.1 μm, the thickness of a depletion layer, i.e., the thickness of the region in which the carrier density is modulated becomes thinner with increase in the carrier density. However, it is to be noted that the mathematical expression 4 is a theoretical expression, and therefore, there is a case that an actual operation does not match to this expression.

On the other hand, it is preferred that, with respect to an effective refractive index $n_{eff}$ that is felt by an electric field of an optical signal in the electro-optical modulator and a wavelength λ (nm) of the optical signal, the depth (length) of a buried portion of the second semiconductor layer buried in the concave portion of the first semiconductor layer is $\lambda/n_{eff}$ (nm) or less. As mentioned above, by controlling the shape of the second semiconductor layer buried in the concave portion so that the overlap between the optical field and the region in which the carrier density is modulated becomes large, an optical phase can be modulated further efficiently.

A method for fabricating the electro-optical modulator shown in FIG. 1 is not particularly limited and is, for example, as follows.

FIGS. 13A to 13D are cross-sectional step drawings illustrating a method for fabricating the electro-optical modulator of FIG. 1. As shown in FIGS. 13A to 13D, the fabrication method includes the steps (a) to (m).

Figure 13A:
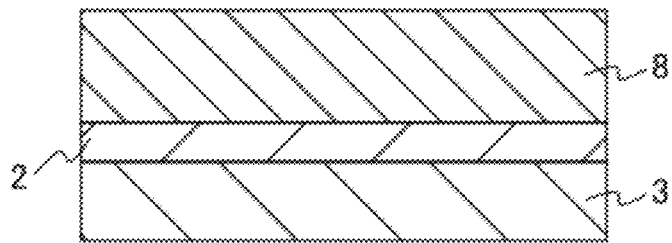
FIGS. 13A-D show cross-sectional step drawings showing some fabrication steps of fabricating the electro-optical modulator of FIG. 1.

First, as shown in FIG. 13A, an SOI substrate used for forming an electro-optical modulator is provided. This SOI substrate is formed by forming an Si layer (p-doped semiconductor silicon 8) with a thickness of about 300 to 1000 nm on the upper surface of a buried oxide layer 2 that is formed on the upper surface of a supporting substrate 3. In order to reduce the optical loss, the thickness of the buried oxide layer 2 is preferably 1000 nm or more. With respect to the Si layer (p-doped semiconductor silicon 8) on this buried oxide layer 2, a substrate that has been previously doped in order to have a desired conductivity type may be used as the Si layer, or the Si layer is subjected to a P-doping treatment or a B-doping treatment by ion implantation or the like and is then subjected to a thermal treatment.

Figure 13B:
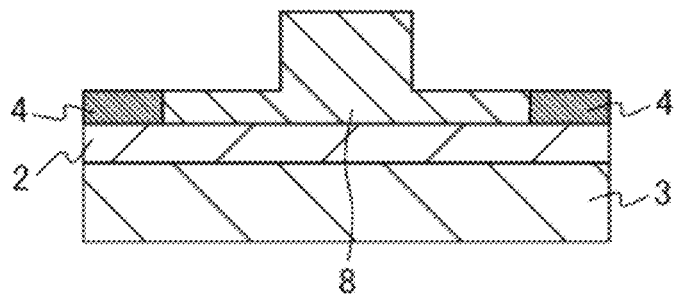

Subsequently, a resist pattern is formed on the upper surface of the p-doped semiconductor silicon 8 (first semiconductor layer), which is then, as shown in FIG. 13B, processed into a rib-type waveguide shape by a reactive etching method. Further, p$^+$-doped regions (p$^+$-doped semiconductor silicon 4) are formed by ion implantation using, as a mask, the resist pattern, which is then subjected to a thermal treatment.

Figure 13C:
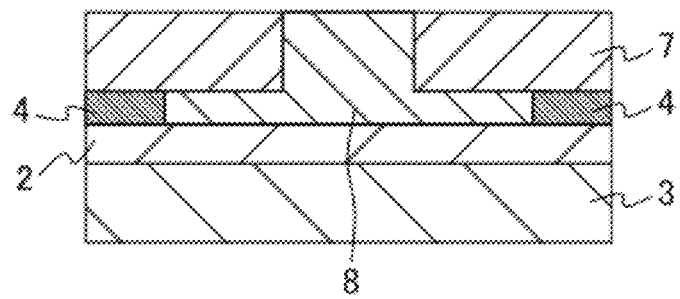

Then, as shown in FIG. 13C, an $SiO_2$ film with a thickness of 300 to 700 nm is stacked thereon as an oxide cladding layer 7, which is then flattened by CMP (chemical-mechanical polishing process) or the like so that the Si rib surface layer is exposed.

Figure 13D:
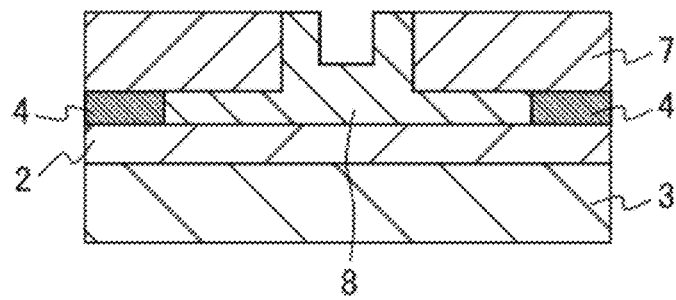

Thereafter, a resist mask pattern is formed on the rib surface, and then, as shown in FIG. 13D, a trench is formed in the Si layer (p-doped semiconductor silicon 8) by a reactive etching method.

Figure 13E:
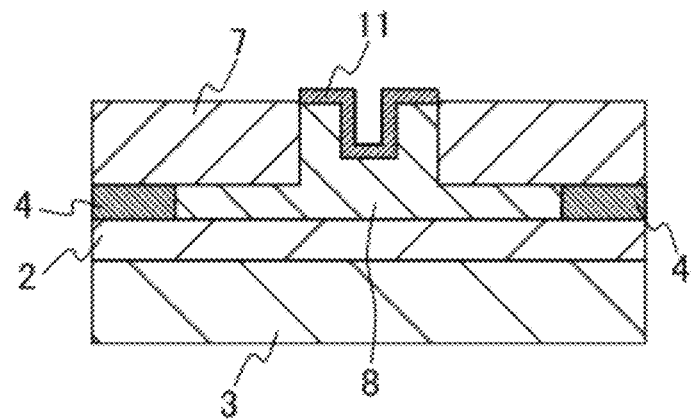
FIGS. 13E-G show cross-sectional step drawings showing some fabrication steps following the fabricating steps of FIGS. 13A-D.

Then, the mask layer used for the patterning is removed, and thereafter, as shown in FIG. 13E, a silicon oxide layer 11 that is a relatively thin dielectric layer (dielectric film) is formed on the upper side of the SOI (p-doped semiconductor silicon 8) by a thermal oxidation treatment. The dielectric film may be, for example, at least one layer selected from a silicon oxide layer, a silicon nitride layer, other high-k insulating layers, and the like.

Figure 13F:
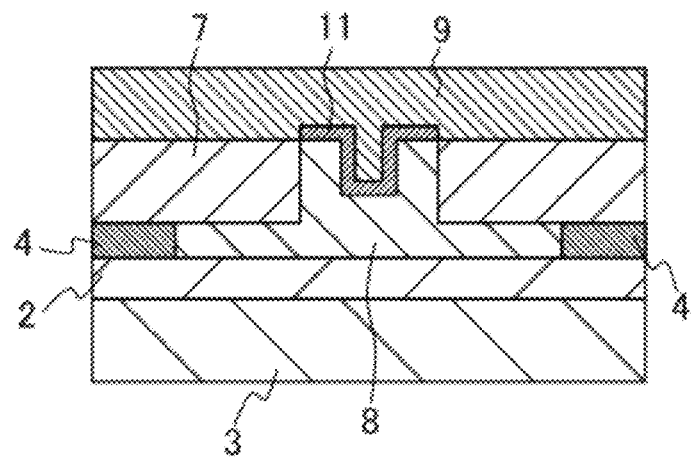

Subsequently, as shown in FIG. 13F, a polycrystalline silicon layer (n-doped polycrystalline silicon 9) is formed on the upper side of the dielectric film 11 by a CVD method or a sputtering method so that the trench part is sufficiently coated, and an electrode lead layer can be formed. At that time, due to the concavo-convex shape in the SOI (p-doped semiconductor silicon 8), the concave-convex shape is transferred and formed in the polycrystalline silicon layer (n-doped polycrystalline silicon 9). It is desired that such a concave-convex shape in the polycrystalline silicon layer is flattened by CMP in order to form electrode contact layers later. The polycrystalline silicon layer may be subjected to a doping treatment while forming it in order to have a second conductivity type or may be subjected to a B-doping treatment or a P-doping treatment by ion implantation or the like after forming it.

Figure 13G:
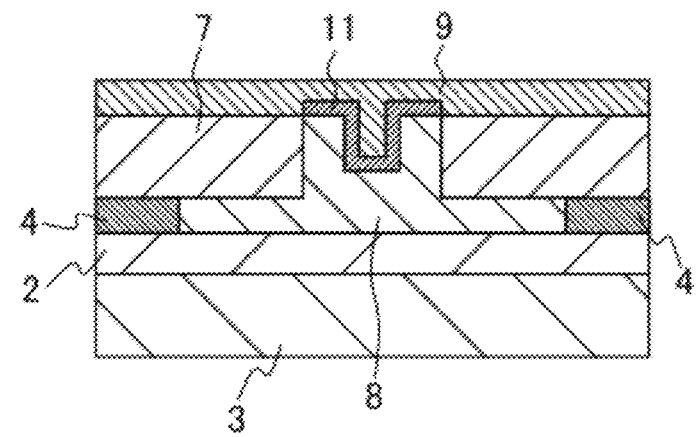

Then, as shown in FIG. 13G, the n-doped polycrystalline silicon layer (n-doped polycrystalline silicon 9) is flattened by CMP, and the thickness of the upper electrode layer is controlled so that the thicknesses becomes about 100 nm.

Figure 13H:
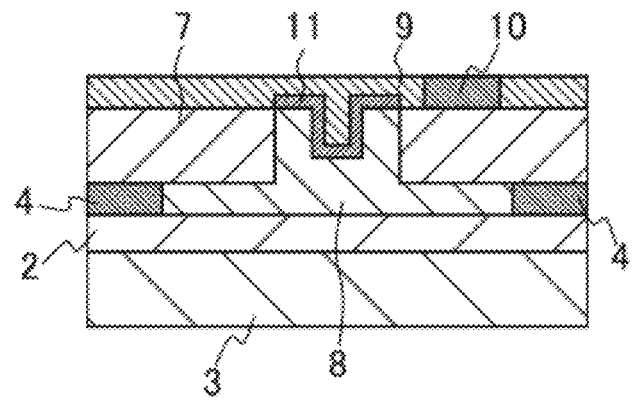
FIGS. 13H-J show cross-sectional step drawings showing some fabrication steps following the fabrication steps of FIGS. 13E-G.

Then, as shown in FIG. 13H, a resist pattern is formed on the surface layer of the polycrystalline silicon layer (n-doped polycrystalline silicon 9), which is then subjected to a B-doping treatment or a P-doping treatment by an ion implantation method or the like. Thus, an n$^+$-doped semiconductor silicon 10 (second highly-doped portion) is formed.

Figure 13I:
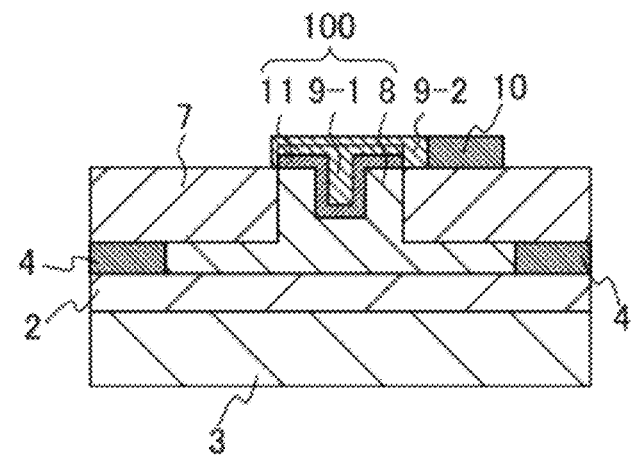

Then, as shown in FIG. 13I, a resist pattern is formed on the upper surface of the polycrystalline silicon layer (n-doped polycrystalline silicon 9) that becomes the upper electrode layer, which is then processed into a shape corresponding to electrodes by patterning using a reactive etching method. In FIG. 13I to FIG. 13j and FIG. 13K to FIG. 13M, the n-doped polycrystalline silicon 9 (second semiconductor layer) is shown by dividing it into a rib waveguide portion 9-1 and a portion 9-1 except the rib waveguide. However, this is as a matter of convenience, and as mentioned above, in actual fact, the part 9-1 and the part 9-2 are integrally formed, and the boundary between them is not clear.

Figure 13J:
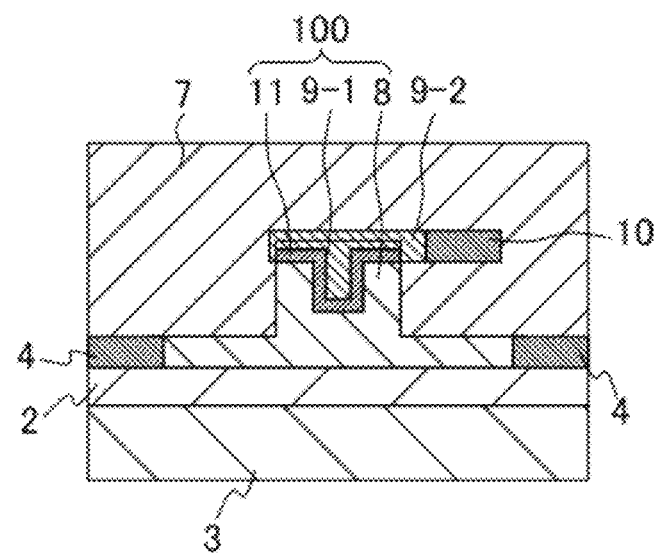

As shown in FIG. 13J, an oxide cladding 7 is formed, which is then flattened by CMP.

Figure 13K:
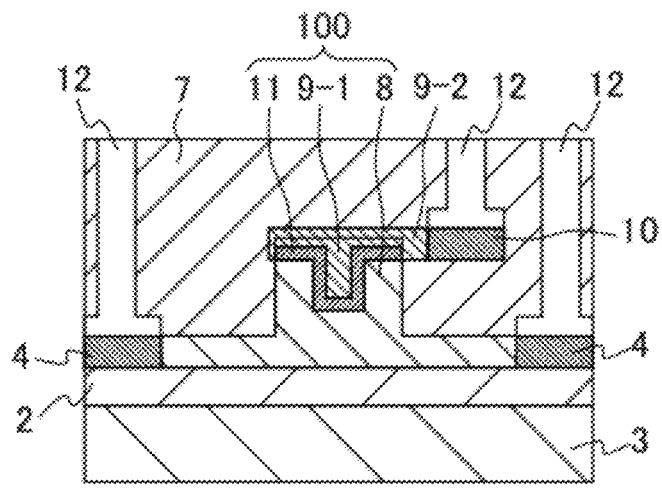
FIGS. 13K-M show cross-sectional step drawings showing some fabrication steps following the fabrication steps of FIGS. 13H-J.
Figure 13L:
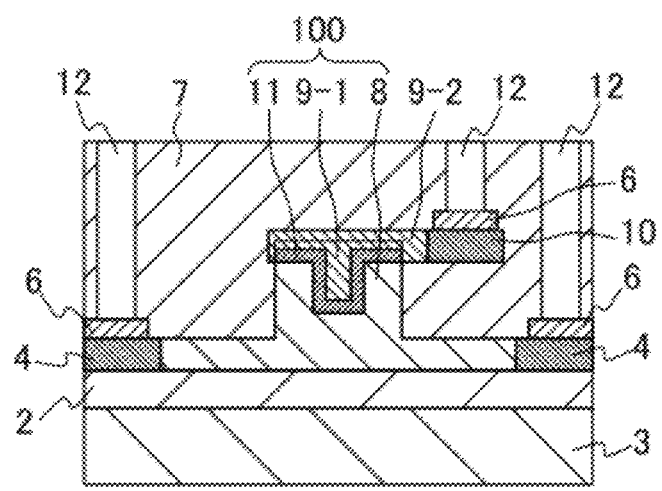
Figure 13M:
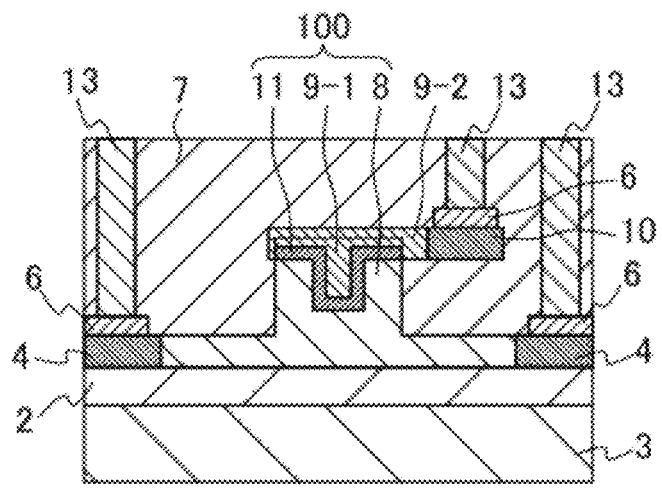

As shown in FIG. 13K, contact holes 12 each for extracting an electrode are formed on the respective upper sides of the high doping concentration regions (p$^+$-doped semiconductor silicon 4 and n$^+$-doped semiconductor silicon 10). Furthermore, as shown in FIG. 13L, the respective films of Ni are formed on the p$^+$-doped semiconductor silicon 4 and n$^+$-doped semiconductor silicon 10. Thus, silicide layers (electrode contact layers 6) are formed. Then, as shown in FIG. 13M, via wires 13 formed of TaN/Al (Cu) or the like are formed in the respective contact holes. Thus, the electro-optical modulator of the present embodiment is formed. The electro-optical modulator is connected to a driving circuit through connecting to an external terminal via portions of the via wires 13 exposed on the upper surface.

Figure 2:
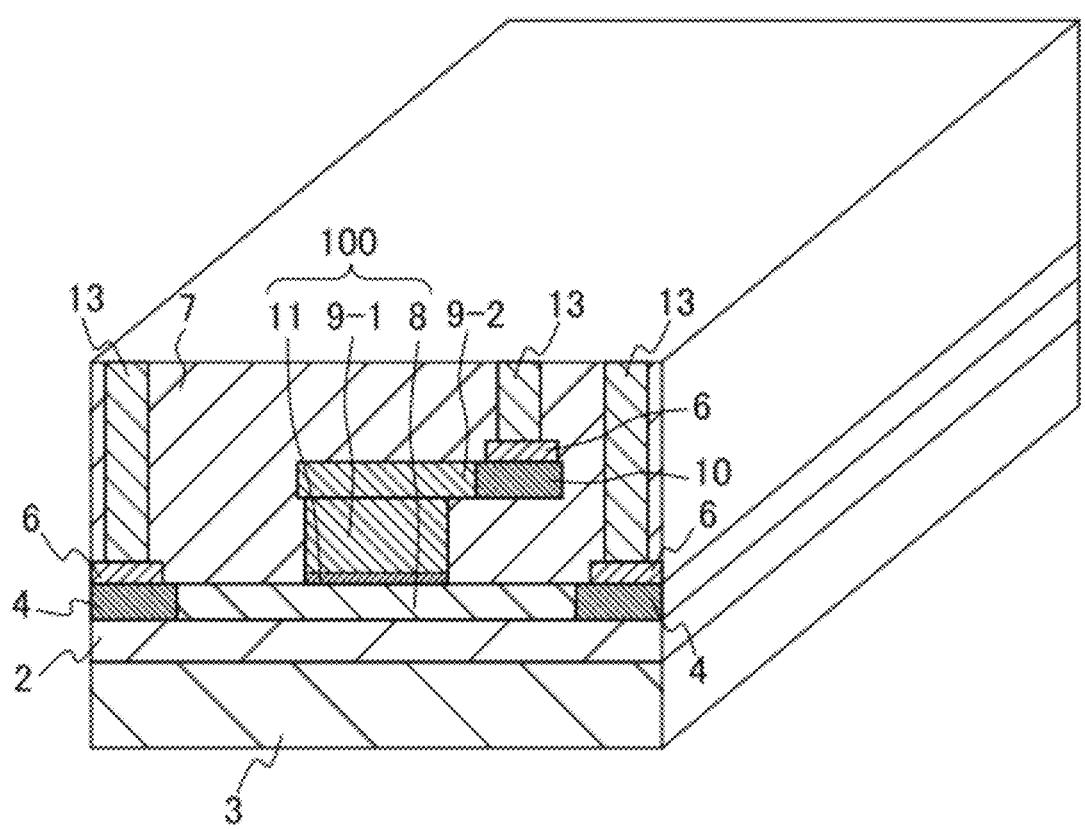
FIG. 2 is a cross-sectional perspective view showing an example of a deformed structure of the electro-optical modulator of FIG. 1.

An example of a deformed structure of the electro-optical modulator of the electro-optical modulator of FIG. 1 is shown in the cross-sectional perspective view of FIG. 2. As shown in FIG. 2, in a stacked portion (SIS junction portion) including a p-doped semiconductor silicon 8 (first semiconductor layer), a dielectric film 11, and an n-doped polycrystalline silicon 9 (second semiconductor layer) of this electro-optical modulator, the p-doped semiconductor silicon 8 (first semiconductor layer) does not have a concavo-convex shape, so that it is flat. Other than this, the structure of the electro-optical modulator of FIG. 2 is the same as that of the electro-optical modulator of FIG. 1. In FIG. 2, a rib waveguide portion 9-1 and a portion 9-2 of the n-doped polycrystalline silicon 9 (second semiconductor layer) are integrally formed as in FIG. 1, and however, a step of forming the rib waveguide portion 9-1 may be different from that of the portion 9-2. Even in the case where the rib waveguide portion 9-1 and the portion 9-2 are formed by the different steps, materials (composition) may be the same. In the electro-optical modulator of the present invention, as shown in FIG. 2, the first semiconductor layer may not have a concavo-convex shape in the stacked portion including the first semiconductor layer, the dielectric film, and the second semiconductor layer, so that it is flat. However, it is preferred that the first semiconductor layer has a concave-convex shape in the stacked portion, and the dielectric film and the second semiconductor layer are stacked so as to be fitted in the concavo-convex shape. With this configuration, an overlap between a region in which the carrier density is modulated and the optical field is improved, and the modulation efficiency is further enhanced.

Second Embodiment

Figure 3:
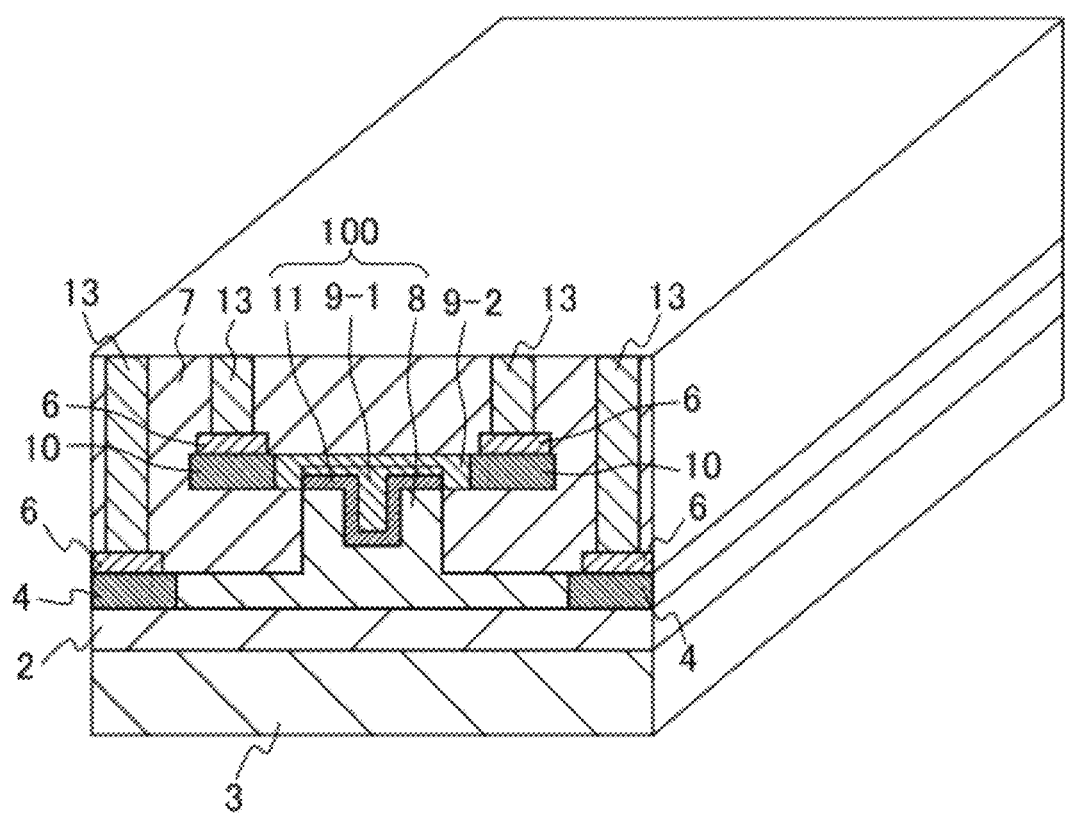
FIG. 3 is a cross-sectional perspective view illustrating a structure of an electro-optical modulator in another embodiment of the present invention.

Another embodiment of the electro-optical modulator of the present invention is shown in the cross-sectional perspective view of FIG. 3. As shown in FIG. 3, in this electro-optical modulator, an n-doped polycrystalline silicon 9 (second semiconductor layer) extends from the left side of the stacked portion as well as from the right side of the same. As well as in the right end portion of the extending portion, n$^+$-doped semiconductor silicon 10 (second highly-doped portion) with a high doping concentration as compared with the other portion of the n-doped polycrystalline silicon 9 (second semiconductor layer) is formed in the left end portion of the other extending portion. Electrode contact layers 6 (second electrode contact layers) are joined to the respective upper surfaces of the n$^+$-doped semiconductor silicon 10 (second highly-doped portions) in the left end portion and the right end portion. Therefore, it becomes possible to reduce the amount of a series resistance component and an RC time constant, as well as reducing optical losses in highly doped layers (highly-doped portions). Thus, it becomes possible to obtain an electrical connection at low resistance. Other than the above-described structure, the structure of the electro-optical modulator is the same as that of the electro-optical modulator (FIG. 1) of the first embodiment. A method for fabricating the electro-optical modulator is not particularly limited and can be fabricated according to the method for fabricating the electro-optical modulator (FIG. 1) of the first embodiment.

Figure 4:
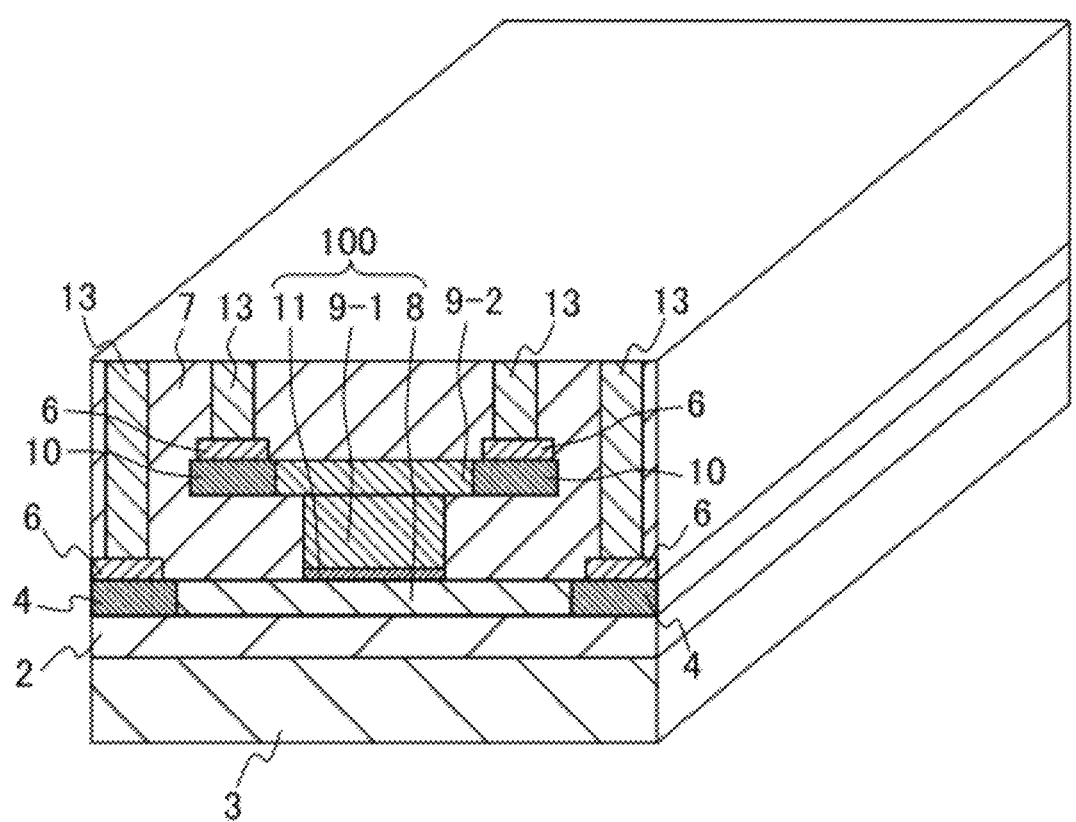
FIG. 4 is a cross-sectional perspective view showing an example of a deformed structure of the electro-optical modulator of FIG. 3.

An example of a deformed structure of the electro-optical modulator of the electro-optical modulator of FIG. 3 is shown in the cross-sectional perspective view of FIG. 4. As shown in FIG. 4, in a stacked portion (SIS junction portion) including a p-doped semiconductor silicon 8 (first semiconductor layer), a dielectric film 11, and an n-doped polycrystalline silicon 9 (second semiconductor layer) of this electro-optical modulator, the p-doped semiconductor silicon 8 (first semiconductor layer) does not have a concavo-convex shape, so that it is flat. Other than this, the structure of the electro-optical modulator of FIG. 4 is the same as that of the electro-optical modulator of FIG. 3. The electro-optical modulator of the present invention may have the structure shown in FIG. 4. However, it is preferred that the p-doped semiconductor silicon 8 (first semiconductor layer) has a concavo-convex shape in a SIS junction portion as shown in FIG. 3, for example. More specifically, it is the same as mentioned in the comparative description between FIG. 1 and FIG. 2.

Third Embodiment

Figure 5:
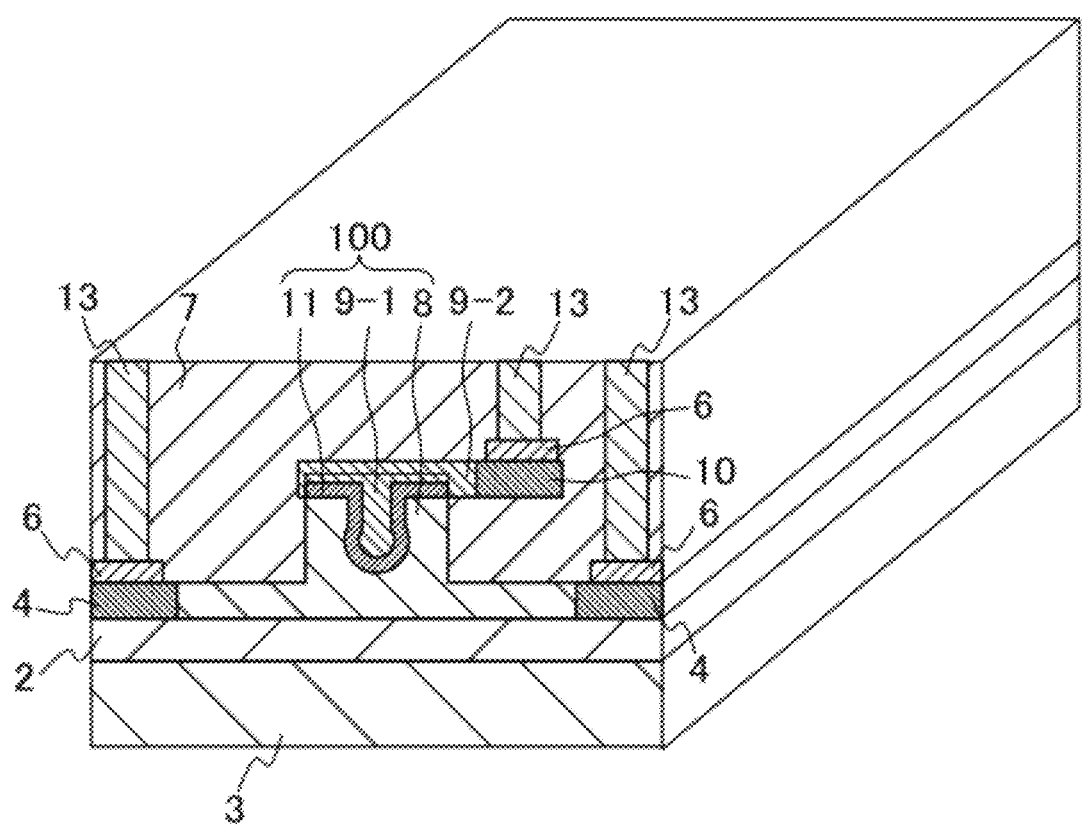
FIG. 5 is a cross-sectional perspective view illustrating a structure of an electro-optical modulator in still another embodiment of the present invention.

Still another embodiment of the electro-optical modulator of the present invention is shown in the cross-sectional perspective view of FIG. 5. As shown in FIG. 5, the surface of a concave portion of a p-doped semiconductor silicon 8 (first semiconductor layer) of this electro-optical modulator has a curved surface or a curved line. That is, the concave portion has a shape including a curvature (a shape in which a curvature is formed). With this configuration, it becomes possible to carry out an optical modulation at lower voltage, and further, the overlap between a carrier modulation region and the optical field becomes bigger, so that it becomes possible to carry out an optical modulation at higher efficiency. Other than the above-described structure, the structure of the electro-optical modulator is the same as that of the electro-optical modulator (FIG. 1) of the first embodiment. A method for fabricating the electro-optical modulator is not particularly limited and can be fabricated according to the method for fabricating the electro-optical modulator (FIG. 1) of the first embodiment.

Fourth Embodiment

Figure 6:
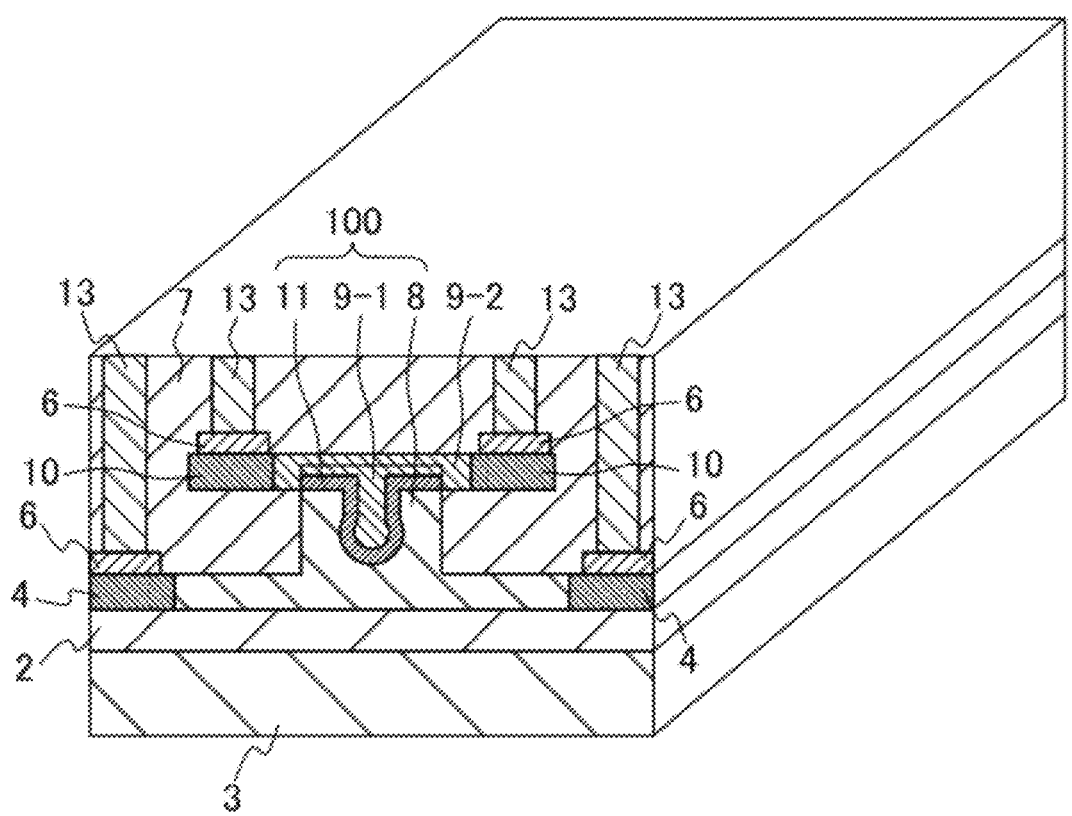
FIG. 6 is a cross-sectional perspective view illustrating a structure of an electro-optical modulator in yet another embodiment of the present invention.

Yet another embodiment of the electro-optical modulator of the present invention is shown in the cross-sectional perspective view of FIG. 6. As shown in FIG. 6, in this electro-optical modulator, an n-doped polycrystalline silicon 9 (second semiconductor layer) extends from the left side of the stacked portion as well as from the right side of the same. As well as in the right end portion of the extending portion, n$^+$-doped semiconductor silicon 10 (second highly-doped portion) with a high doping concentration as compared with the other portion of the n-doped polycrystalline silicon 9 (second semiconductor layer) is formed in the left end portion of the other extending portion. Electrode contact layers 6 (second electrode contact layers) are joined to the respective upper surfaces of the n$^+$-doped semiconductor silicon 10 (second highly-doped portions) in the left end portion and the right end portion. Therefore, it becomes possible to reduce the amount of a series resistance component and an RC time constant, as well as reducing optical losses in highly doped layers (highly-doped portions). Thus, it becomes possible to obtain an electrical connection at low resistance. Other than the above-described structure, the structure of the electro-optical modulator is the same as that of the electro-optical modulator (FIG. 5) of the third embodiment. A method for fabricating the electro-optical modulator is not particularly

Fifth Embodiment

Figure 7:
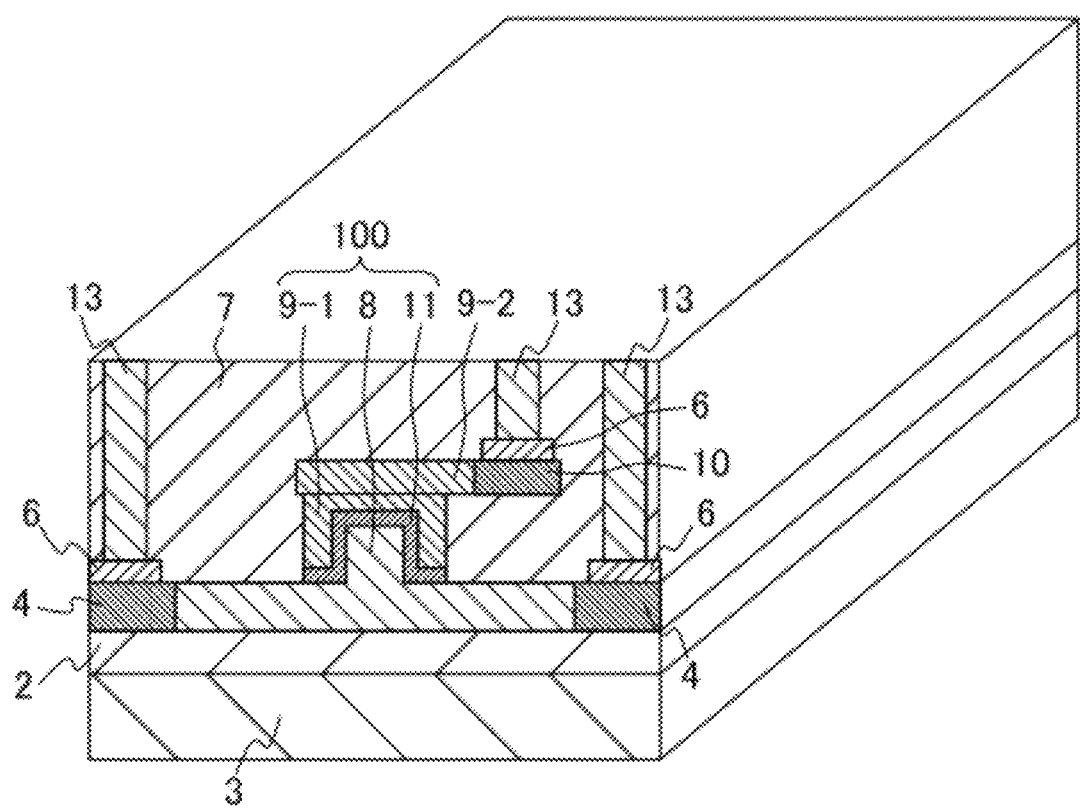
FIG. 7 is a cross-sectional perspective view illustrating a structure of an electro-optical modulator in a further embodiment of the present invention.

A further embodiment of the electro-optical modulator of the present invention is shown in the cross-sectional perspective view of FIG. 7. As shown in FIG. 7, in a stacked portion (SIS junction portion) including a p-doped semiconductor silicon 8 (first semiconductor layer), a dielectric film 11, and an n-doped polycrystalline silicon 9 (second semiconductor layer) of this electro-optical modulator, the p-doped semiconductor silicon 8 (first semiconductor layer) has a portion (convex portion) extending with respect to the other portion, so that a concavo-convex shape is formed. The dielectric film 11 and an n-doped polycrystalline silicon 9 (second semiconductor layer) cover the upper surface and the entire side surface of the convex portion of the p-doped semiconductor silicon 8 (first semiconductor layer) and the surface of the p-doped semiconductor silicon 8 in the vicinity of the bottom end of the convex portion. Other than the above-described structure, the structure of the electro-optical modulator is the same as that of the electro-optical modulator (FIG. 1) of the first embodiment. Even when the concavo-convex shape in the stacked portion including the first semiconductor layer, the dielectric layer, and the second semiconductor layer has the shape shown in FIG. 7, effects of further improving the overlap between a region in which the carrier density is modulated and the optical field and further enhancing the modulation efficiency are exerted as in the electro-optical modulator with the structure of FIG. 1. A method for fabricating the electro-optical modulator of FIG. 7 is not particularly limited and can be fabricated according to the method for fabricating the electro-optical modulator (FIG. 1) of the first embodiment. In FIG. 7, a rib waveguide portion 9-1 and a portion 9-2 of the n-doped polycrystalline silicon 9 (second semiconductor layer) are integrally formed as in FIG. 1, and however, a step of forming the rib waveguide portion 9-1 may be different from that of the portion 9-2. Even in the case where the rib waveguide portion 9-1 and the portion 9-2 are formed by the different steps, materials (composition) may be the same.

In the present invention, the "concavo-convex shape" encompasses the case of having one of a convex portion and a concave portion and the case of having both the convex portion and the concave portion, with respect to the surrounding flat portion. For example, the concavo-convex shape in the first semiconductor layer may be, for example, a shape having only a convex portion with respect to the surrounding flat portion as shown in FIG. 7 or, for example, any of the shapes of FIGS. 1 and 5.

Sixth Embodiment

Figure 8:
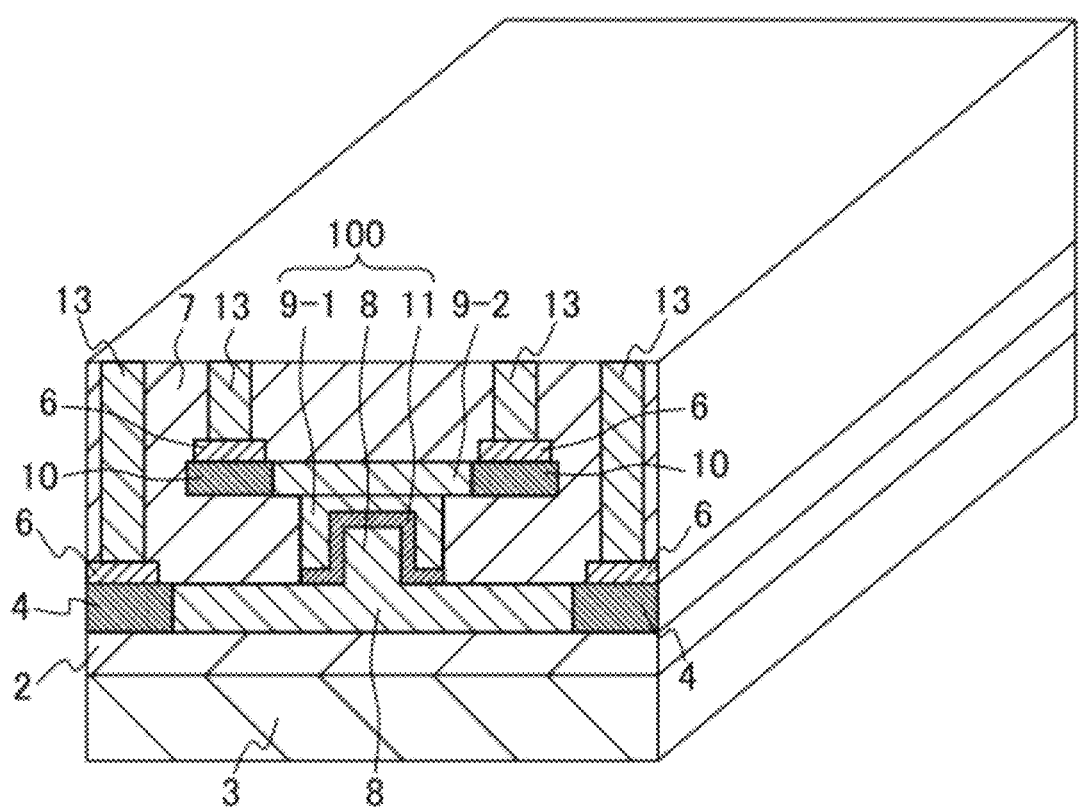
FIG. 8 is a cross-sectional perspective view illustrating a structure of an electro-optical modulator in a still further embodiment of the present invention.

A still further embodiment of the electro-optical modulator of the present invention is shown in the cross-sectional perspective view of FIG. 8. As shown in FIG. 8, in this electro-optical modulator, an n-doped polycrystalline silicon 9 (second semiconductor layer) extends from the left side of the stacked portion as well as from the right side of the same. As well as in the right end portion of the extending portion, $n^+$-doped semiconductor silicon 10 (second highly-doped portion) with a high doping concentration as compared with the other portion of the n-doped polycrystalline silicon 9 (second semiconductor layer) is formed in the left end portion of the other extending portion. Electrode contact layers 6 (second electrode contact layers) are joined to the respective upper surfaces of the $n^+$-doped semiconductor silicon 10 (second highly-doped portions) in the left end portion and the right end portion. Therefore, it becomes possible to reduce the amount of a series resistance component and an RC time constant, as well as reducing optical losses in highly doped layers (highly-doped portions). Thus, it becomes possible to obtain an electrical connection at low resistance. Other than the above-described structure, the structure of the electro-optical modulator is the same as that of the electro-optical modulator (FIG. 7) of the fifth embodiment. A method for fabricating the electro-optical modulator is not particularly limited and can be fabricated according to the method for fabricating the electro-optical modulator of any of the embodiments.

Figure 9:
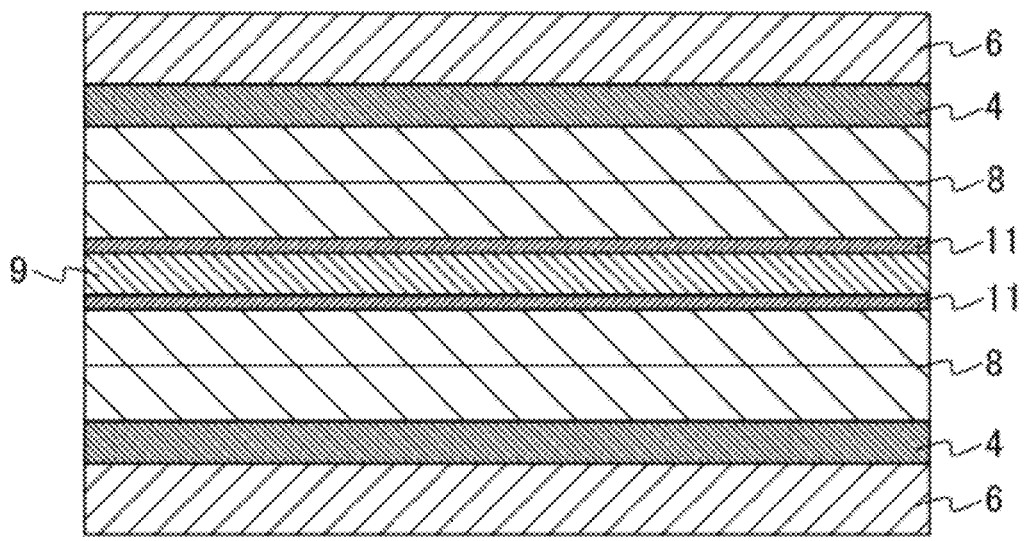
FIG. 9 is an upper cross-sectional view of the electro-optical modulator of FIG. 3, without some components.

An upper cross-sectional view of the electro-optical modulators shown in FIGS. 1 and 3 (first embodiment and the second embodiment) is shown in FIG. 9. It is to be noted that some components are omitted from the figure as a matter of convenience. As mentioned above, it is desired that when the thickness of a region in which the carrier density is modulated (the maximum thickness of a depletion layer) is W, the width of the buried polycrystalline silicon layer (n-doped polycrystalline silicon 9) is 2 W or less. The concavo-convex shape may be a grating shape with periodicity in the light propagation direction, for example. The period may be formed periodically so as to reduce a group velocity of an optical signal or may be arranged so as to have an interval of $\lambda/n_{eff}$ or less in order to suppress a reflection of an optical signal when the effective refractive index that is felt non-periodically by an electric field of an optical signal is $n_{eff}$ and the wavelength is λ (nm) of the optical signal.

Figure 10A:
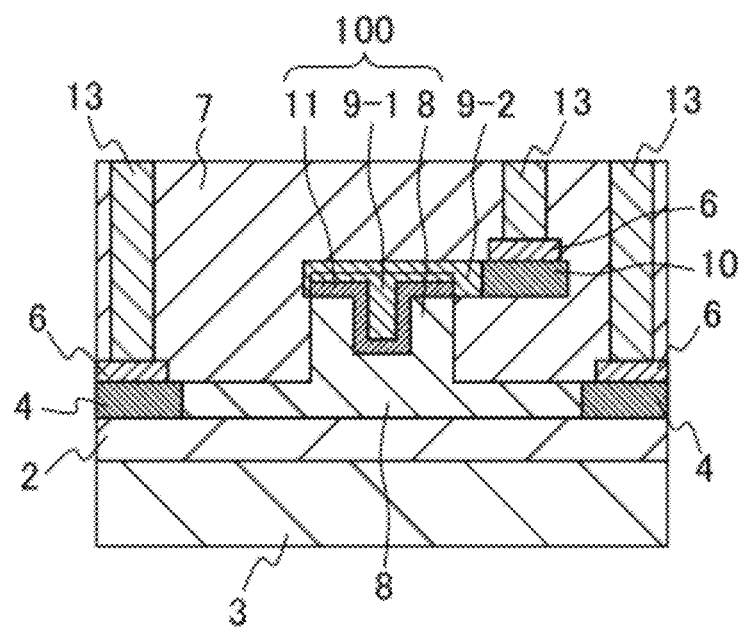
FIG. 10A is a cross-sectional view of the electro-optical modulator of FIG. 1.
Figure 10B:
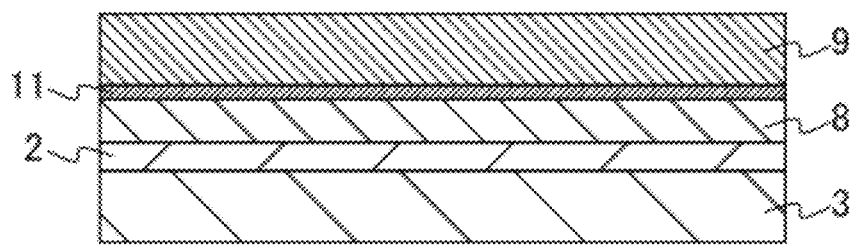
FIG. 10B is a cross-sectional view in the light propagation direction (optical waveguide direction), schematically showing a portion of the stacked structure of the electro-optical modulator of FIG. 1.
Figure 11A:
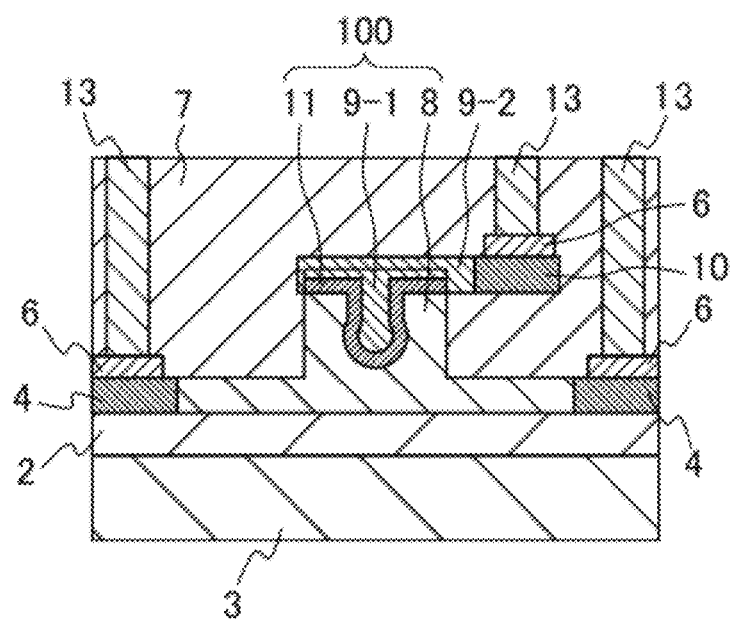
FIG. 11A is a cross-sectional view of the electro-optical modulator of FIG. 5.
Figure 11B:
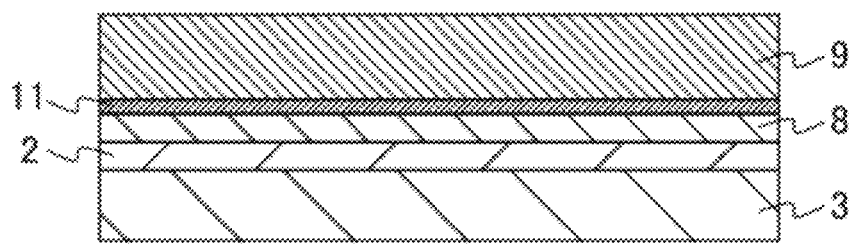
FIG. 11B is a cross-sectional view in the light propagation direction (optical waveguide direction), schematically showing a portion of the stacked structure of the electro-optical modulator of FIG. 5.
Figure 12A:
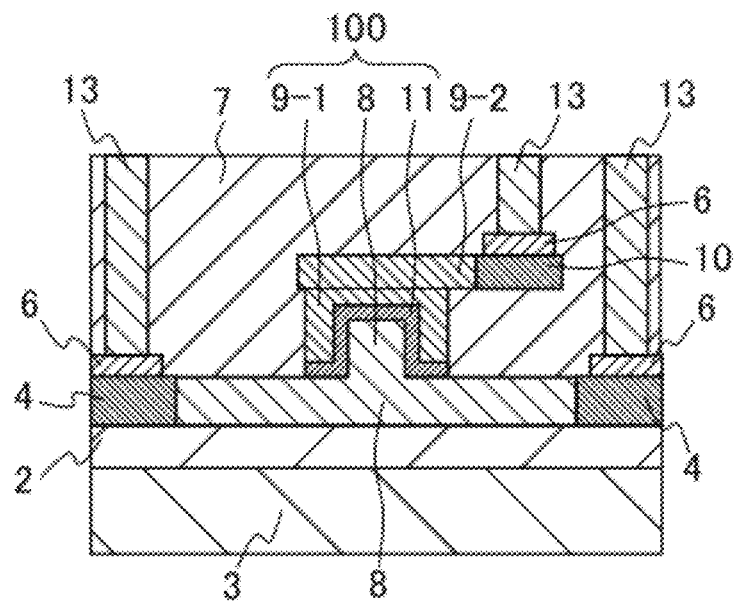
FIG. 12A is a cross-sectional view of the electro-optical modulator of FIG. 7.
Figure 12B:
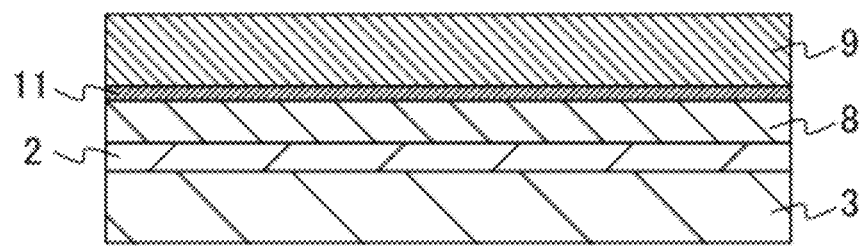
FIG. 12B is a cross-sectional view in the light propagation direction (optical waveguide direction), schematically showing a portion of the stacked structure of the electro-optical modulator of FIG. 7.

FIGS. 10A, 11A, and 12A are cross-sectional views of the respective electro-optical modulators of the first embodiment, the third embodiment, and the fifth embodiment. FIGS. 10B, 11B, and 12B are cross-sectional views schematically showing the light propagation direction (optical waveguide direction). FIGS. 10A, 11A, and 12A are cross-sectional views of the respective structures, and FIGS. 10B, 11B, and 12B are the cross-sectional views schematically showing the light propagation direction (optical waveguide direction). The cross sections of the respective cross-sectional views are the same as those shown in FIGS. 1, 5, and 7. In each of the cross-sectional views schematically showing the light propagation direction (optical waveguide direction), a p-doped semiconductor silicon 8 (first semiconductor layer), a dielectric film 11, and an n-doped polycrystalline silicon 9 (second semiconductor layer) are formed in this order on the upper surface of a buried oxide layer 2 formed on the upper surface of a supporting substrate 3. The cross-sectional views schematically showing the light propagation direction (optical waveguide direction) of FIGS. 10B, 11B, and 12B are all the same. That is, in each of these electro-optical modulators, a SIS (semiconductor—insulator—semiconductor) type junction structure formed by forming a relatively thin dielectric (dielectric film) on the interface between the p-doped semiconductor silicon 8 (first semiconductor layer) and the n-doped polycrystalline silicon 9 (second semiconductor layer) is formed. At this SIS-type junction, free carriers are accumulated, removed, or inverted in the vicinity of the contact surfaces with the dielectric film 11 by an electrical signal from electrodes bound to the first semiconductor layer (doped region) and the second semiconductor layer (doped region), and whereby a concentration of the free carriers in an electric field of an optical signal is modulated.

In order to improve the frequency band region, the carrier mobility and the carrier life time are really important in addition to the above-mentioned conditions. Specifically, the carrier mobility in the polycrystalline silicon layer greatly affects on the high-speed operation. Therefore, it is preferred that the carrier mobility is improved by increasing the crystalline size of the polycrystalline silicon through re-crystallization by an annealing treatment, or the crystal quality of the polycrystalline silicon is improved using an epitaxial lateral overgrowth (ELO) method in the second semiconductor layer.

Seventh Embodiment

Figure 17:
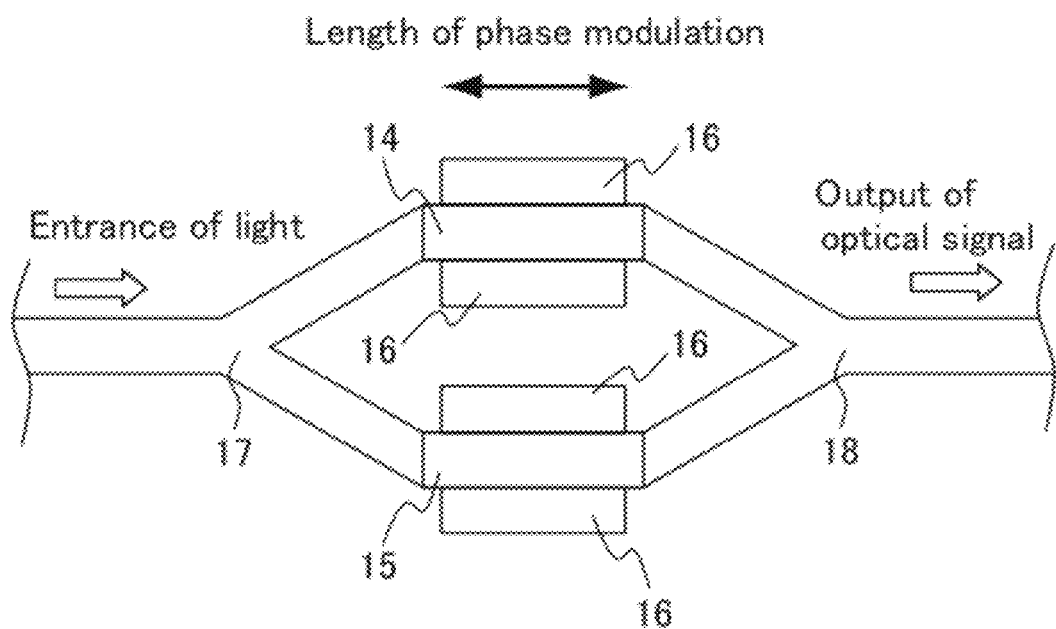
FIG. 17 is a plan view schematically showing an example of the structure of a Mach-Zehnder interferometer-type optical intensity modulator of the present invention.
Figure 18:
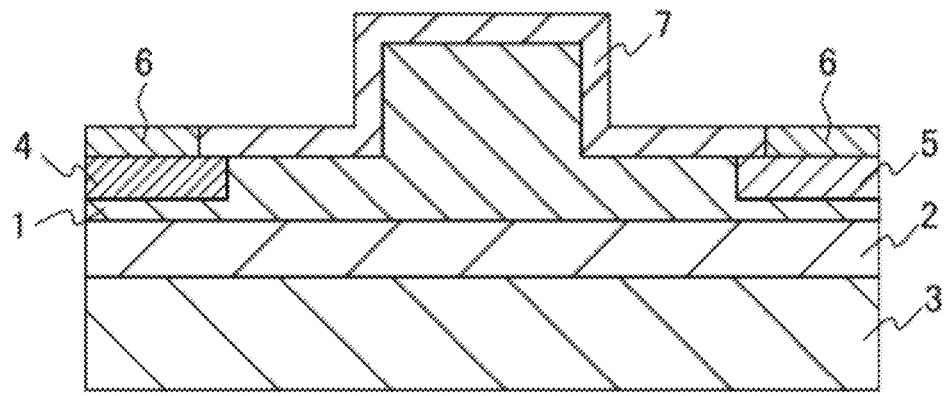
FIG. 18 is a cross-sectional view schematically showing an example of the structure of a silicon-based electro-optical modulator as a PIN diode-type modulator.
Figure 19:
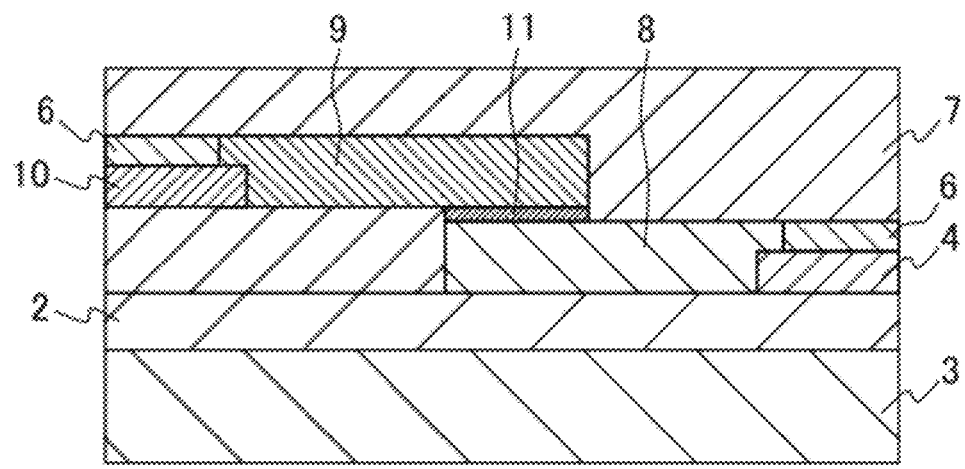
FIG. 19 is a cross-sectional view schematically showing an example of the structure of a silicon-based electro-optical modulator with the SIS structure.

An example of the structure of the Mach-Zehnder interferometer-type optical intensity modulator of the present invention is schematically shown in the plan view of FIG. 17. As shown in FIG. 17, in this Mach-Zehnder interferometer-type optical intensity modulator, a first arm 14 and a second arm 15 each including the silicon-based electro-optical modulator of the present invention are arranged in parallel. The first arm 14 and the second arm 15 each is provided with an electrode pad 16 for driving an electro-optical modulator. An optical branch path (optical branch structure) 17 of binding to the input sides of the first arm 14 and the second arm 15 and an optical coupling path (an optical coupling structure or an optical multiplexing structure) 18 of binding to the output sides of the first arm 14 and the second arm 15 are connected to both of the first arm 14 and the second arm 15. Therefore, the phase modulation of optical signals is carried out in the first arm and the second arm, and the optical signals are converted into an optical intensity modulation signal by subjecting them to a phase interference in the optical coupling path.

In the Mach-Zehnder interferometer-type optical intensity modulator of FIG. 17, input light is branched due to the optical branch structure arranged on the input sides so that the power of the branched light in the first arm becomes the same as that in the second arm, for example. Then, by applying a positive voltage to the first arm, the carrier accumulation occurs in the vicinity of the contact surfaces of the first semiconductor and the second semiconductor with the dielectric film (thin dielectric layer) of the electro-optical modulator of the present invention. Furthermore, by applying a negative voltage to the second arm, carriers in the vicinity of the contact surfaces of the first semiconductor and the second semiconductor with the dielectric film are removed. Therefore, in the carrier accumulation mode, an effective refractive index felt by the electric field of the optical signal in the electro-optical modulator becomes small, and in the carrier removal (depletion) mode, an effective refractive index felt by the electric field of the optical signal in the electro-optical modulator becomes large, so that the optical signal phase difference between the first arm and second arm becomes maximum. The optical signals transmitted through this both the arms are coupled by the optical coupling structure on the output sides, so that an optical intensity modulation occurs. The electro-optical modulator of the present invention can send an optical signal of 20 Gbps or more, for example. By arranging electro-optical modulators each composed of the Mach-Zehnder interferometer in parallel or in series, they are applicable to an optical modulators with high transmission rate and matrix optical switches.

EXAMPLES

The electro-optical modulators shown in FIGS. 1 and 2 were fabricated, and the characteristics thereof were evaluated. The evaluation results are shown in FIGS. 14 to 16.

Figure 14:
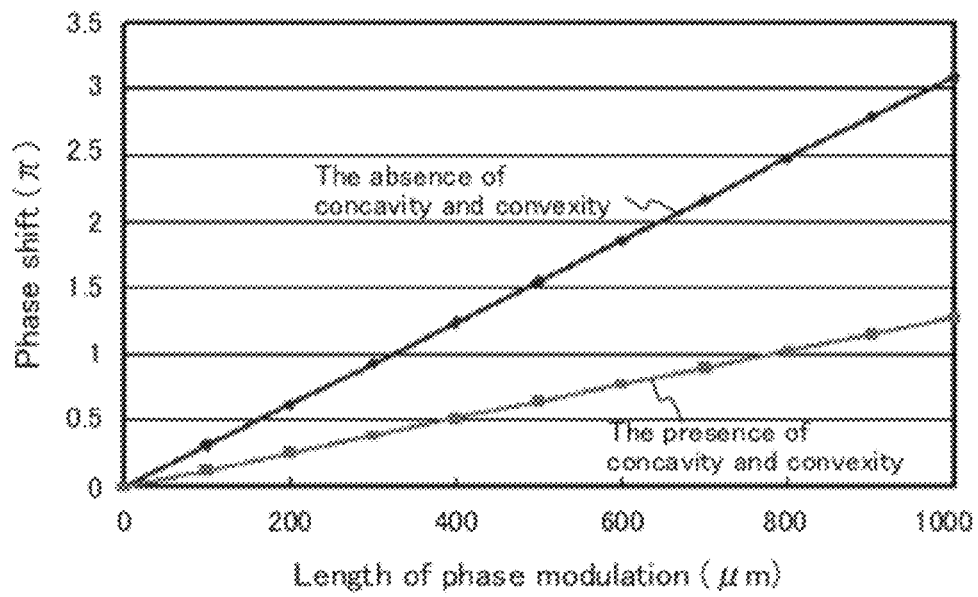
FIG. 14 is a graph illustrating a correlation between the length of the optical modulation and the amount of the phase shift in an electro-optical modulator of the present invention.

A dependence correlation of the amount of the phase shift on the length (the length of the optical modulation) in the optical signal propagation direction is shown in the graph of FIG. 14. In FIG. 14, the vertical axis indicates the amount ($\pi$) of the phase shift, while the horizontal axis indicates the length (nm) of the optical modulation. In FIG. 14, "the absence of concavity and convexity" shows a plot of the electro-optical modulator of FIG. 2 having no concave-convex shape in a portion of the first semiconductor layer on which the dielectric film and the second semiconductor layer are stacked. "The presence of concavity and convexity" shows a plot of the electro-optical modulator of FIG. 1 having a concavo-convex shape in a portion of the first semiconductor layer on which the dielectric film and the second semiconductor layer are stacked. As shown in FIG. 14, both the electro-optical modulators exhibited superior optical modulation efficiency. Specifically, the optical modulation efficiency of the electro-optical modulator of FIG. 1 was significantly improved. In the electro-optical modulator of FIG. 1 used in the present example, the width of the buried portion of the second semiconductor layer buried in the concave portion is set to about 160 nm or less that is the same as the thickness of a region in which the carrier modulation is carried out (the maximum width of a depletion layer). Furthermore, in the present example, the depth of a buried portion buried in the concave portion was set to about $\lambda/n_{eff}$. Therefore, the optical modulation efficiency is further improved.

Figure 15:
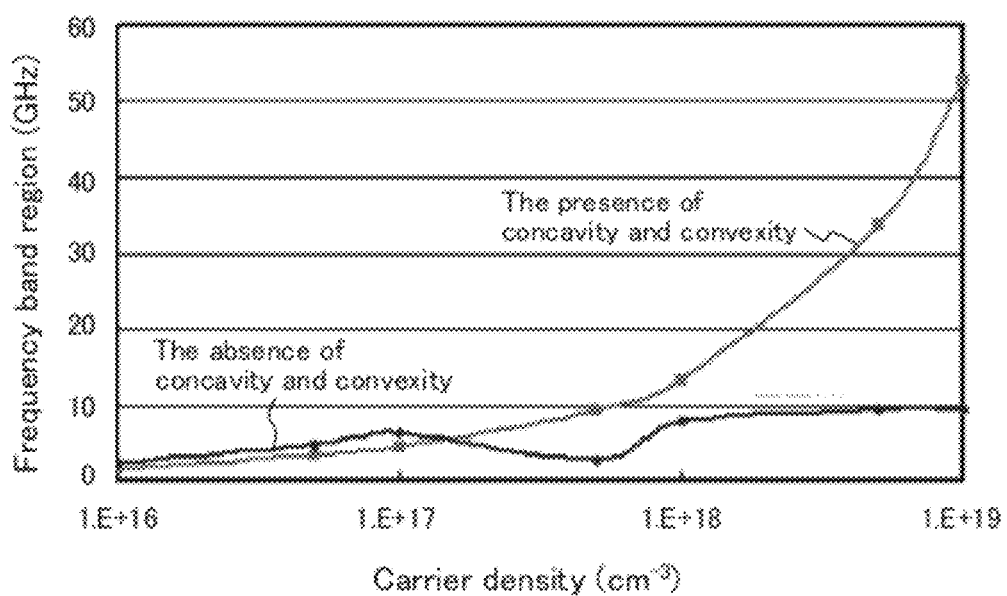
FIG. 15 is a graph illustrating a correlation between the carrier density in the modulation region and the frequency band region in an electro-optical modulator of the present invention.

A correlation between the operating frequency band region and the carrier density is shown in a graph of FIG. 15. In FIG. 15, the vertical axis indicates the operating frequency band region (GHz), while the horizontal axis indicates the carrier density ($cm^3$). In FIG. 15, "the absence of concavity and convexity" shows a plot of the electro-optical modulator of FIG. 2 having no concavo-convex shape in a portion (hereinafter, also referred to as a "SIS junction portion" as a matter of convenience) of the first semiconductor layer on which the dielectric film and the second semiconductor layer are stacked. "The presence of concavity and convexity" shows a plot of the electro-optical modulator of FIG. 1 having a concave convex shape in a SIS junction portion. Both the electro-optical modulators exhibited high operating frequency band region and could operate at high speed. Specifically, the electro-optical modulator of FIG. 1 having a concavo-convex shape in the SIS junction portion could operate at extremely high speed of 10 GHz or more by setting the carrier density to $10^{18}/cm^3$ or more. In the present example, the depth (the length) of a buried portion of the second semiconductor layer buried in the concave portion in the electro-optical modulator of FIG. 1 was set to $\lambda/n_{eff}$ (nm) or more ($n_{eff}$ represents the effective refractive index felt by the electric field of the optical signal, and $\lambda$ represents the wavelength (nm) of the optical signal). Therefore, the electric capacity of the electro-optical modulator is increased, and it became possible to operate the electro-optical modulator at extremely high speed. It is to be noted that when it is desired that the electro-optical modulator is further downsized, the thickness of the electro-optical modulator is reduced, or the like, even when the depth (length) of the buried portion of the second semiconductor layer is set to less than $\lambda/n_{eff}$, the electro-optical modulator can operate at sufficiently high speed. It is because the electro-optical modulator of the present invention has the above-mentioned specific structure, so that the modulation efficiency is improved.

Figure 16A:
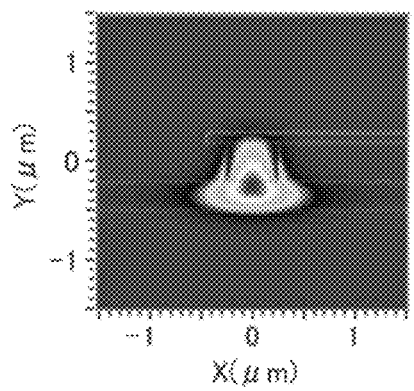
FIGS. 16A and 16B show examples of optical electric field intensity distributions in the respective electro-optical modulators of the present invention.
Figure 16B:
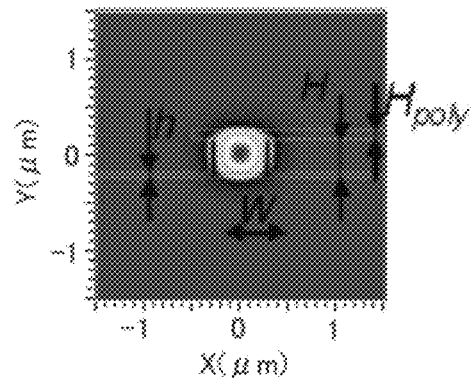

Optical electric field intensity (optical field) distributions are shown in photographs of FIGS. 16A and 16B. The photograph in FIG. 16A on the left side shows the electro-optical modulator of FIG. 2 having no concavo-convex shape in a SIS junction portion, the photograph in FIG. 16B on the right side shows the electro-optical modulator of FIG. 1 having a concavo-convex shape in a SIS junction portion. In FIGS. 16A and 16B, the horizontal axis indicates the X-coordinate (μm) in the left and right direction of the cross section of FIG. 1 or 2, while the vertical axis indicates the Y-coordinate (μm) in the up and down direction of the cross section of FIG. 1 or 2. The point (X-coordinate=0, Y-coordinate=0) indicates the middle of the rib waveguide. In FIGS. 16A and 16B, each optical electric field intensity distribution shows the distribution by indicating the changes in the effective refractive index felted by the electric field of the optical signal with colors. In FIG. 16B, h represents the thickness of a portion (a portion other than the SIS junction portion) of the first semiconductor layer on which the dielectric film and the second semiconductor layer are not stacked, $H_{poly}$ represents the thickness of the extending portion of the second semiconductor layer, extending from the rib waveguide, and W represents the thickness (the maximum width of a depletion layer, nm) of a region in which the free carriers are accumulated, removed, or inverted of the second semiconductor layer. As shown in FIGS. 16A and 16B, in the electro-optical modulator of FIG. 1 having a concavo-convex shape in the SIS junction portion (having convexo-concave formed at the SIS junction interface) (FIG. 16B), the overlap between the region (optical field) in which the effective refractive index was changed and the waveguide (carrier modulation region) became large compared with the electro-optical modulator (FIG. 16A) of FIG. 2. Therefore, it is considered that the optical modulation efficiency and the operation speed are further enhanced as mentioned above.

Furthermore, a Mach-Zehnder interferometer-type optical intensity modulator shown in FIG. 17 was formed using the electro-optical modulator shown in FIG. 1, in which the SIS junction portion has a concavo-convex shape. An optical signal is sent using this Mach-Zehnder interferometer-type optical intensity modulator. Thus, it was confirmed that the Mach-Zehnder interferometer-type optical intensity modulator can send an optical signal of 20 Gbps or more.

The invention of the present application is described above with reference to the embodiments and the examples. However, various changes that can be understood by those skilled in the art can be made in the configurations and details of the invention within the scope of the invention of the present application.

This application claims priority from Japanese Patent Application No. 2009-209766 filed on Sep. 10, 2009. The entire subject matter of the Japanese Patent Applications is incorporated herein by reference.

EXPLANATION OF REFERENCE NUMERALS 1 intrinsic semiconductor silicon
2 buried oxide layer
3 supporting substrate
4 p⁺-doped semiconductor silicon
5 n⁺-doped semiconductor silicon
6 electrode contact layer
7 oxide cladding
8 p-doped semiconductor silicon
9 n-doped polycrystalline silicon
9-1 n-doped polycrystalline silicon (rib waveguide portion)
9-2 n-doped polycrystalline silicon (portion except the rib waveguide)
n⁺-doped polycrystalline silicon
11 dielectric layer
12 contact hole
13 via wire
14 first arm
15 second arm
16 electrode pad for driving electro-optical modulator
17 optical branch path (optical branch structure)
18 optical coupling path (optical coupling structure)
100 rib waveguide

The invention claimed is:
1. An electro-optical modulator comprising:
a first semiconductor layer;
a second semiconductor layer; and
a dielectric film,
wherein
the first semiconductor layer and the second semiconductor layer are being doped so that a conductivity type of the first semiconductor layer is different from that of the second semiconductor layer,
a portion of the first semiconductor layer is a first highly-doped portion with a high doping concentration compared with the other portion of the first semiconductor layer,
a portion of the second semiconductor layer is a second highly-doped portion with a high doping concentration compared with the other portion of the second semiconductor layer,
the first highly-doped portion and the second highly-doped portion each is connectable to an external terminal directly or via other member,
a rib waveguide is formed by stacking the second semiconductor layer on an upper side of the first semiconductor layer via the dielectric film,
in a region in the vicinity of contact surfaces of the first semiconductor layer and the second semiconductor layer with the dielectric film, a free carrier is accumulated, removed, or inverted by an electrical signal from the external terminal, and whereby a concentration of the free carrier in an electric field region of an optical signal is modulated, so that a phase of the optical signal can be modulated,
at least one of the first semiconductor layer and the second semiconductor layer is wider than a stacked portion including the first semiconductor layer, the dielectric film, and the second semiconductor layer,
at least one of the first highly-doped portion and the second highly-doped portion is formed outside the stacked portion,
a portion of the first semiconductor layer on which the dielectric film and the second semiconductor layer are stacked has a concavo-convex shape,
the dielectric film and the second semiconductor layer are stacked on the portion so as to be fitted in the concavo-convex shape,
the concavo-convex shape of the first semiconductor layer is a shape having a curvature, and
with respect to a thickness W (nm) of a region of the second semiconductor layer in which a free carrier is accumulated, removed, or inverted, at least one of a maximum width of a convex portion in the concavo-convex shape of the first semiconductor layer and a maximum width of a buried portion of the second semiconductor layer buried in a concave portion of the first semiconductor layer is 2 W (nm) or less.

2. The electro-optical modulator according to claim 1, further comprising:
a first electrode contact layer; and
a second electrode contact layer, wherein
the first electrode contact layer is joined to the first highly doped portion, the second electrode contact layer is joined to the second highly-doped portion, the first highly-doped portion is connectable to an external terminal via other member at least including the first electrode contact layer, and the second highly-doped portion is connectable to an external terminal via other member at least including the second electrode contact layer.

3. The electro-optical modulator according to claim 1, wherein the first semiconductor layer and the second semiconductor layer are formed of silicon.

4. The electro-optical modulator according to claim 1, wherein with respect to an effective refractive index $n_{\mathit{eff}}$ that is felt by an electric field of an optical signal in the electro-optical modulator and a wavelength λ (nm) of the optical signal, a height of the convex portion in the concavo-convex shape of the first semiconductor or a depth (length) of a buried portion of the second semiconductor layer buried in the concave portion of the first semiconductor layer is $\lambda/n_{\mathit{eff}}$ (nm) or less.

5. The electro-optical modulator according to claim 1, wherein an effective refractive index of a portion of the second semiconductor layer formed above the rib waveguide portion is 10% or more less than an effective refractive index of the rib waveguide.

6. The electro-optical modulator according to claim 1, wherein the second semiconductor layer is a polycrystalline semiconductor layer.

7. The electro-optical modulator according to claim 1, wherein a region in which an electric field of an optical signal exerts peak intensity is present in a region in which a free carrier is accumulated, removed, or inverted.

8. The electro-optical modulator according to claim 1, wherein at least one of the first semiconductor layer and the second semiconductor layer is formed of at least one semiconductor layer selected from the group consisting of polycrystalline silicon, amorphous silicon, strained silicon, single-crystalline silicon, and $Si_xGe_{1-x}$ (0≤X≤1).

9. The electro-optical modulator according to claim 1, satisfying at least one of the following conditions (A) and (B):

(A) a condition where the first semiconductor layer extends from a stacked portion including the first semiconductor layer, the dielectric film, and the second semiconductor layer in both directions along a direction perpendicular to a stacking direction and a rib waveguide direction, and each of the extending portions is provided with the first highly-doped portion; and (B) a condition where the second semiconductor layer extends from a stacked portion including the first semiconductor layer, the dielectric film, and the second semiconductor layer in both directions along a direction perpendicular to a stacking direction and a rib waveguide direction, and each of the extending portions is provided with the second highly-doped portion.

10. The electro-optical modulator according to claim 9, satisfying both of the conditions (A) and (B).

11. The electro-optical modulator according to claim 1, wherein an electrical modulation signal can be converted into an optical modulation signal by inputting the electrical modulation signal into at least one of the first highly-doped portion and the second highly-doped portion.

12. A Mach-Zehnder interferometer-type optical intensity modulator comprising:

a first arm;

a second arm;

an optical branch path; and an optical coupling path, wherein:

the first arm and the second arm each includes the electro-optical modulator according to claim 1 and each has an input function and an output function, the optical branch path and the optical coupling path each includes a rib-type waveguide, the optical branch path binds to input sides of the first arm and the second arm, branches an optical signal entered into the optical branch path, and can input the respective branched optical signals into the first arm and the second arm, the first arm and the second arm can modulate phases of the respective input, branched optical signals and output the respective modulated optical signals, the optical coupling path binds to output sides of the first arm and the second arm, causes the respective optical signals subjected to the phase modulation in the first arm and the second arm and output to be subjected to phase interference by binding the optical signals, thereby being capable of converting the optical signals into an optical intensity modulation signal.

13. The Mach-Zehnder interferometer-type optical intensity modulator according to claim 12, wherein the rib-type waveguide in each of the optical branch path and the optical coupling path is an Si (silicon) waveguide.

14. The Mach-Zehnder interferometer-type optical intensity modulator according to claim 12, wherein an effective refractive index felt by an electric field of an optical signal in the rib-type waveguide of each of the optical branch path and the optical coupling path is in a range from 95% to 105% with respect to each of effective refractive indexes of the respective portions of the first arm and the second arm to be subjected to the phase modulation.

15. The Mach-Zehnder interferometer-type optical intensity modulator according to claim 12, wherein a length of the first arm is different from that of the second arm.

16. The Mach-Zehnder interferometer-type optical intensity modulator according to claim 12, wherein the optical branch path can input the respective signals with different intensities from each other to the first arm and the second arm.

17. A Mach-Zehnder interferometer-type optical intensity modulator integrated structure, comprising a plurality of the Mach-Zehnder interferometer-type optical intensity modulators according to claim 12.

18. The Mach-Zehnder interferometer-type optical intensity modulator integrated structure, further comprising a plurality of the Mach-Zehnder interferometer-type optical intensity modulators according to claim 12, wherein the plurality of the Mach-Zehnder interferometer-type optical intensity modulators according to claim 12 are arranged in parallel.

19. The Mach-Zehnder interferometer-type optical intensity modulator integrated structure, comprising a plurality of the Mach-Zehnder interferometer-type optical intensity modulators according to claim 12, wherein the plurality of the Mach-Zehnder interferometer-type optical intensity modulators according to claim 15 are arranged in series.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,002,144 B2 | |
| APPLICATION NO. | : 13/395329 | |
| DATED | : April 7, 2015 | |
| INVENTOR(S) | : Junichi Fujikata et al. | |

It is certified that error appears in the above-identified patent and that said Letters Patent is hereby corrected as shown below:

In the Specification

Column 9, Line 45: Delete "mach" and insert -- match --

Column 10, Line 12: Delete "$\mu_e$" and insert -- $m_e$ --

Column 10, Line 13: Delete "$\mu_h$" and insert -- $m_h$ --

In the Claims

Column 23, Line 45: In Claim 8, delete "($0 \leq X \leq 1$)." and insert -- ($0 \leq X \ll 1$). --

Column 24, Line 58: In Claim 18, delete "structure, further comprising" and insert -- structure comprising --

Column 24, Line 65: In Claim 19, delete "structure, comprising" and insert -- structure comprising --

Signed and Sealed this
Seventeenth Day of November, 2015

Michelle K. Lee
*Director of the United States Patent and Trademark Office*